(12) United States Patent
Suzuki et al.

(10) Patent No.: US 10,855,123 B2
(45) Date of Patent: Dec. 1, 2020

(54) ROTATING ELECTRICAL MACHINE AND PRODUCING METHOD OF ROTATING ELECTRICAL MACHINE

(71) Applicant: KABUSHIKI KAISHA YASKAWA DENKI, Kitakyushu (JP)

(72) Inventors: Takeo Suzuki, Kitakyushu (JP); Motomichi Ohto, Kitakyushu (JP); Kenichi Hirata, Kitakyushu (JP); Hiroki Takamura, Kitakyushu (JP); Yosuke Shirozu, Kitakyushu (JP); Yuta Matsunami, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 116 days.

(21) Appl. No.: 16/131,037

(22) Filed: Sep. 14, 2018

(65) Prior Publication Data

US 2019/0013706 A1 Jan. 10, 2019

Related U.S. Application Data

(63) Continuation of application No. PCT/JP2017/010748, filed on Mar. 16, 2017.

(30) Foreign Application Priority Data

Mar. 18, 2016 (WO) .................. PCT/JP2016/058849

(51) Int. Cl.
*H02K 1/18* (2006.01)
*H02K 1/14* (2006.01)
*H02K 15/02* (2006.01)

(52) U.S. Cl.
CPC ............... *H02K 1/148* (2013.01); *H02K 1/18* (2013.01); *H02K 15/024* (2013.01); *H02K 2201/15* (2013.01); *H02K 2213/03* (2013.01)

(58) Field of Classification Search
CPC ........ H02K 1/148; H02K 1/18; H02K 15/024; H02K 15/02; H02K 2201/15; H02K 2213/03
(Continued)

(56) References Cited

U.S. PATENT DOCUMENTS

| 2002/0084716 A1 | 7/2002 | Harter et al. |
| 2002/0093269 A1 | 7/2002 | Harter et al. |

(Continued)

FOREIGN PATENT DOCUMENTS

| CN | 1502161 A | 6/2004 |
| CN | 102771032 A | 11/2012 |

(Continued)

OTHER PUBLICATIONS

Machine translation of JP-2001045684-A. (Year: 2001).*

(Continued)

*Primary Examiner* — Michael Andrews
(74) *Attorney, Agent, or Firm* — Mori & Ward, LLP

(57) ABSTRACT

A rotating electrical machine includes a plurality of core pieces forming a stator core. Each of the core pieces includes contact surfaces on one side end and another side end in a peripheral direction, a tapered protrusion on the contact surface of the one side end, the protrusion including first inclined surfaces outside and inside, and a recess on the contact surface of the other side end, the recess including second inclined surfaces contacting the first inclined surfaces outside and inside to receive the protrusion of adjacent core piece. A cross-sectional shape of the protrusion is a shape such that, inside a circle centered on a first end portion with a distance being a radius between a second end portion located on an opposite side of the first end portion and the first end portion, at least a part of the first inclined surfaces contact the second inclined surfaces.

11 Claims, 14 Drawing Sheets

(58) Field of Classification Search
USPC .......................................... 310/216.009, 179
See application file for complete search history.

(56) References Cited

U.S. PATENT DOCUMENTS

| | | |
|---|---|---|
| 2002/0125782 A1 | 9/2002 | Peachee et al. |
| 2002/0134118 A1 | 9/2002 | Peachee et al. |
| 2002/0135254 A1 | 9/2002 | Peachee et al. |
| 2002/0135255 A1 | 9/2002 | Williams et al. |
| 2002/0139606 A1 | 10/2002 | Williams et al. |
| 2009/0066183 A1* | 3/2009 | Aramaki .............. H02K 15/022 310/216.008 |
| 2010/0007236 A1* | 1/2010 | Sano .................... H02K 1/148 310/216.135 |
| 2010/0148246 A1 | 6/2010 | Bhalla et al. |

FOREIGN PATENT DOCUMENTS

| | | |
|---|---|---|
| EP | 1885043 A1 | 2/2008 |
| JP | 11-289695 | 10/1999 |
| JP | 11-341716 | 12/1999 |
| JP | 2001-045684 | 2/2001 |
| JP | 2001045684 A * | 2/2001 |
| JP | 2004-534493 A | 11/2004 |
| JP | 2011-135634 | 7/2011 |
| JP | 2014-180090 | 9/2014 |
| WO | WO 2006/120975 | 11/2006 |
| WO | WO 2008/047942 | 4/2008 |
| WO | WO 2011/098103 A2 | 8/2011 |

OTHER PUBLICATIONS

Japanese Office Action for corresponding JP Application No. 2018-506018, dated Mar. 5, 2020 (w/ machine translation).
International Search Report for corresponding International Application No. PCT/JP2017/010748, dated Jun. 13, 2017.
Japanese Office Action for corresponding JP Application No. 2018-506018, dated Sep. 6, 2019 (w/ machine translation).
Extended European Search Report for corresponding EP Application No. 17766806.6, dated Oct. 11, 2019.
Chinese Office Action for corresponding CN Application No. 201780017912.1, dated Jan. 3, 2020.
English translation of the Written Opinion for corresponding International Application No. PCT/JP2017/010748, dated Sep. 27, 2018.

* cited by examiner

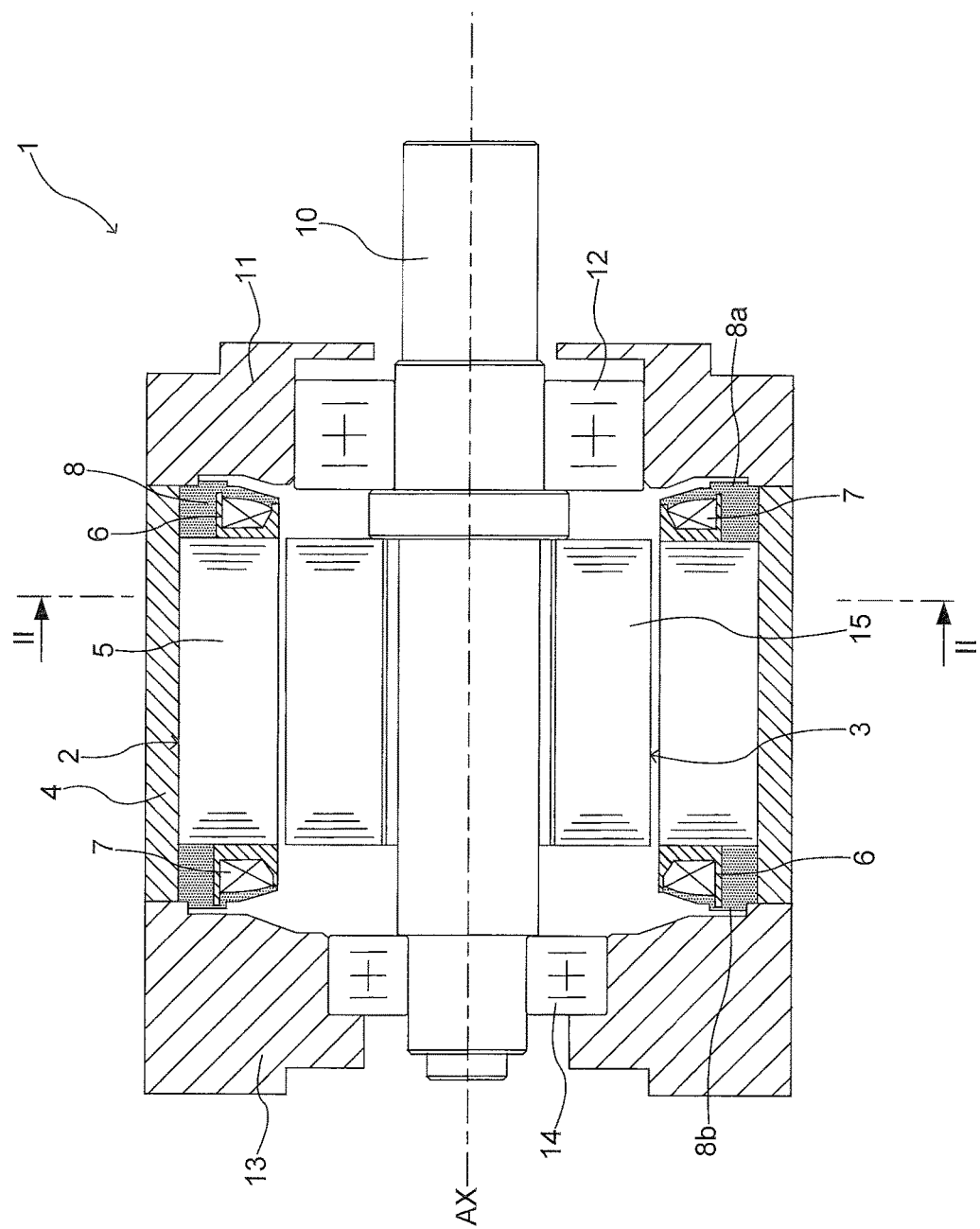
[FIG. 1]

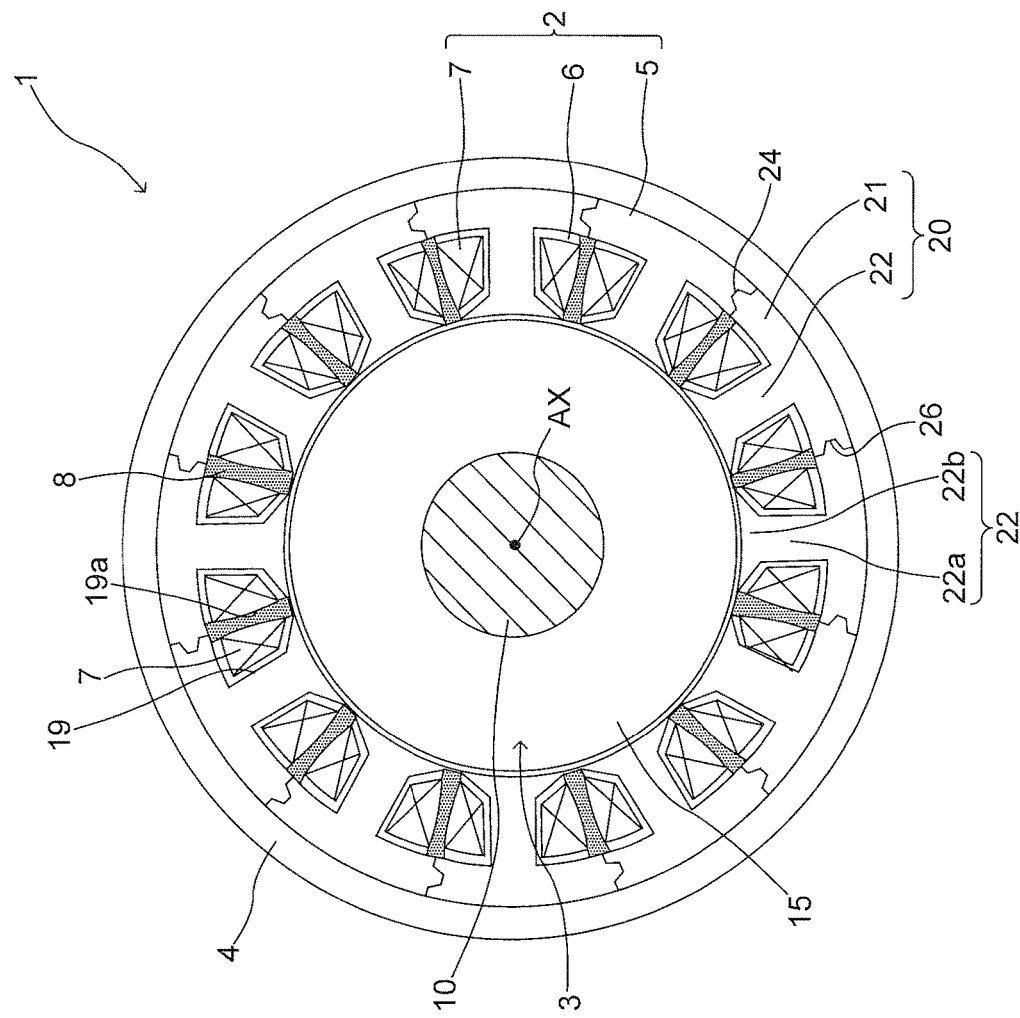
[FIG. 2]

[FIG. 3]
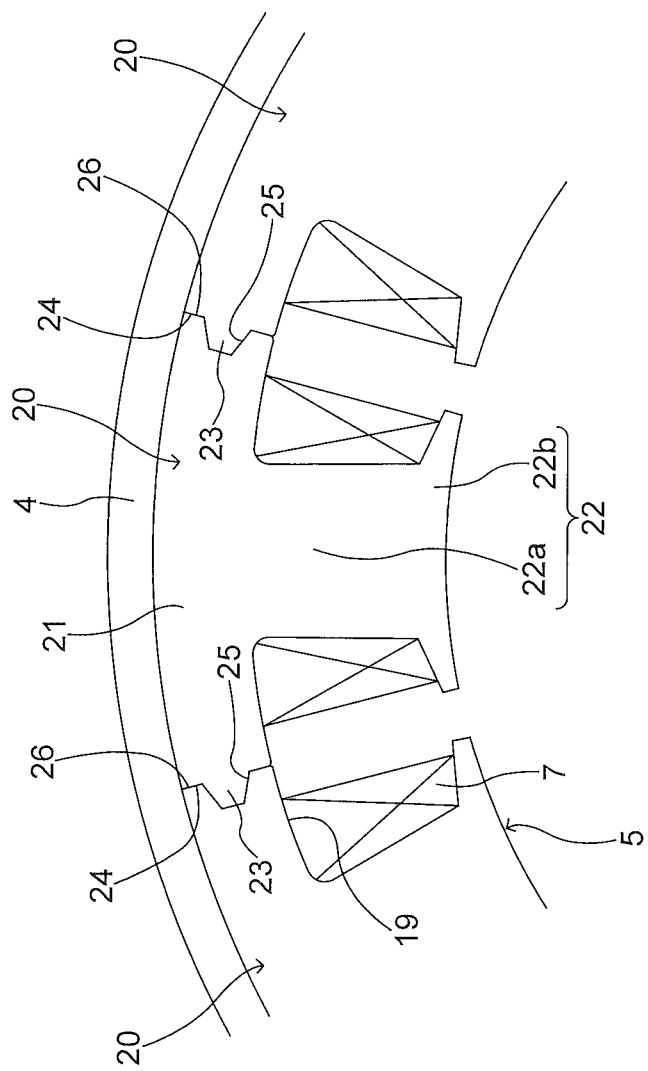

[FIG. 4]
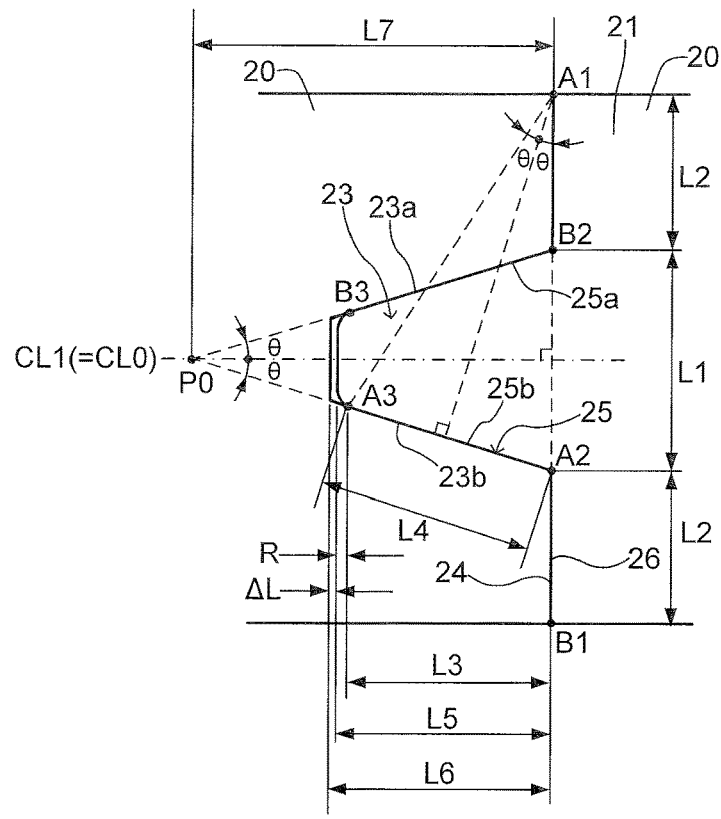
[FIG. 5]
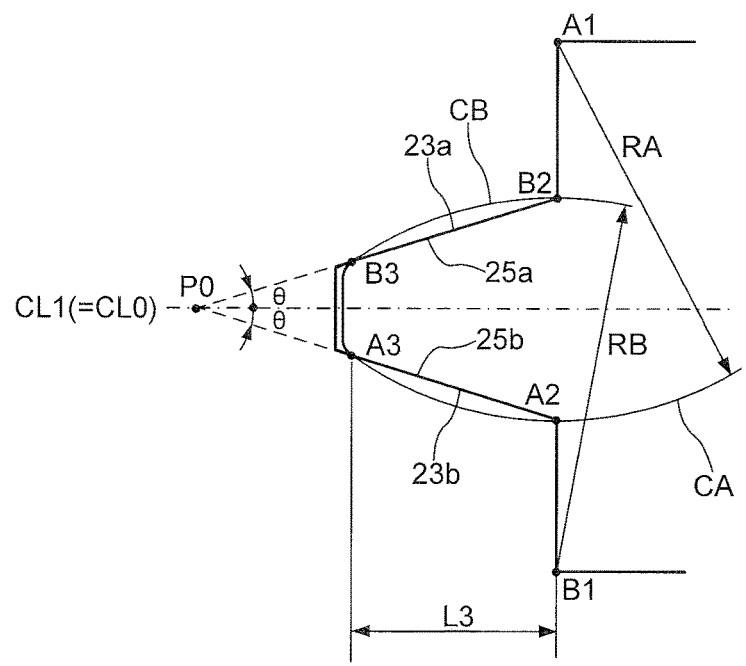

[FIG. 6]
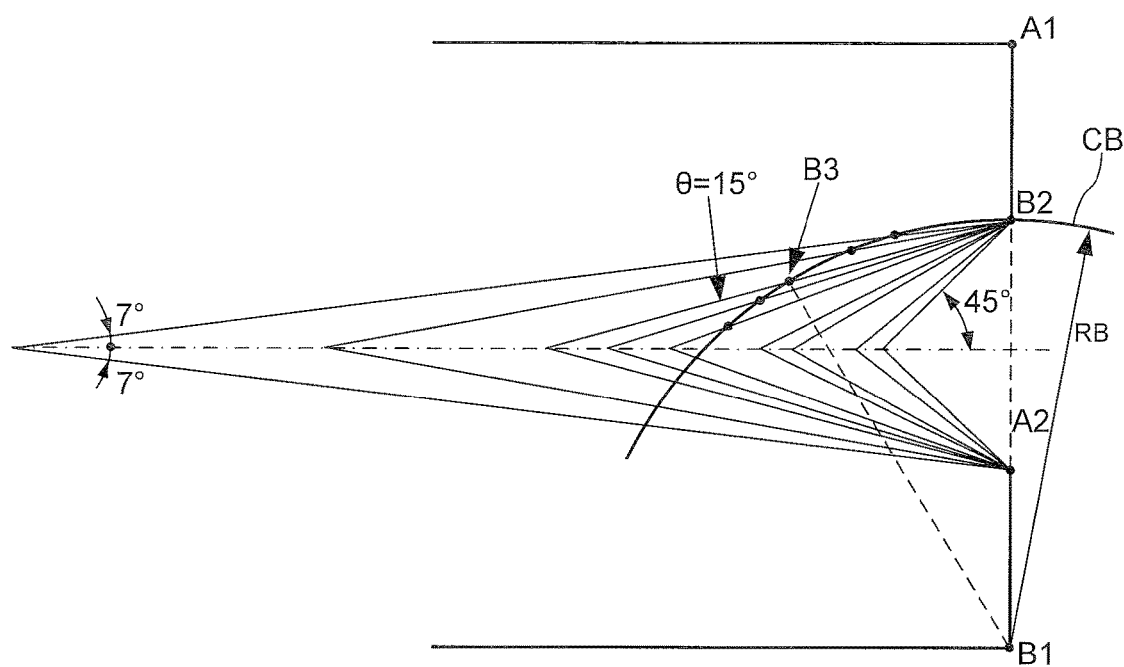

[FIG. 7]
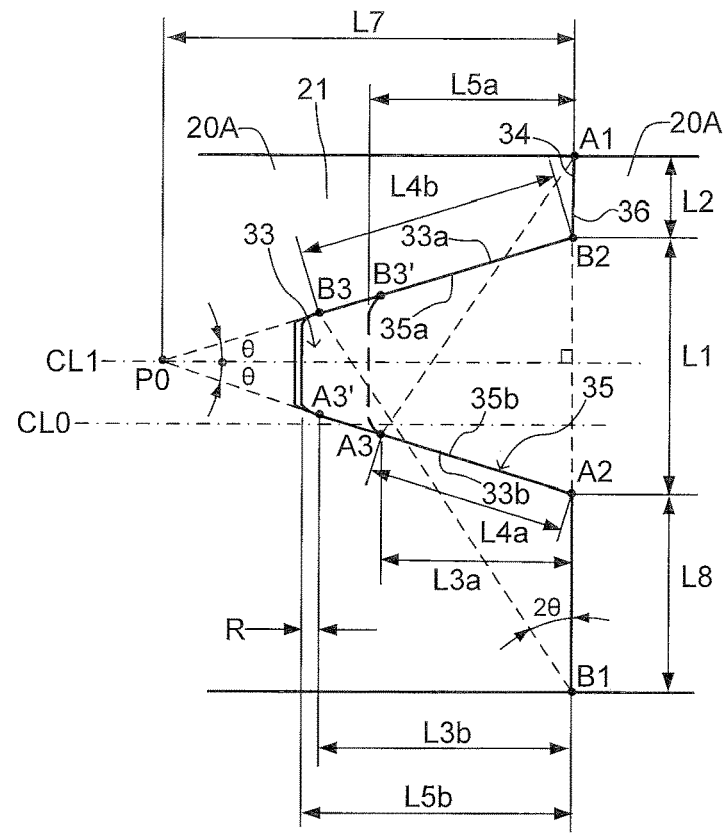
[FIG. 8]
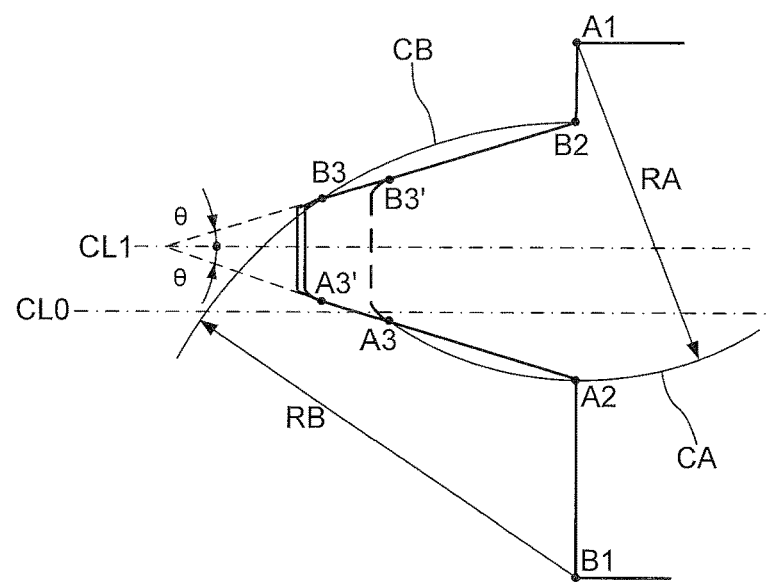

[FIG. 9]
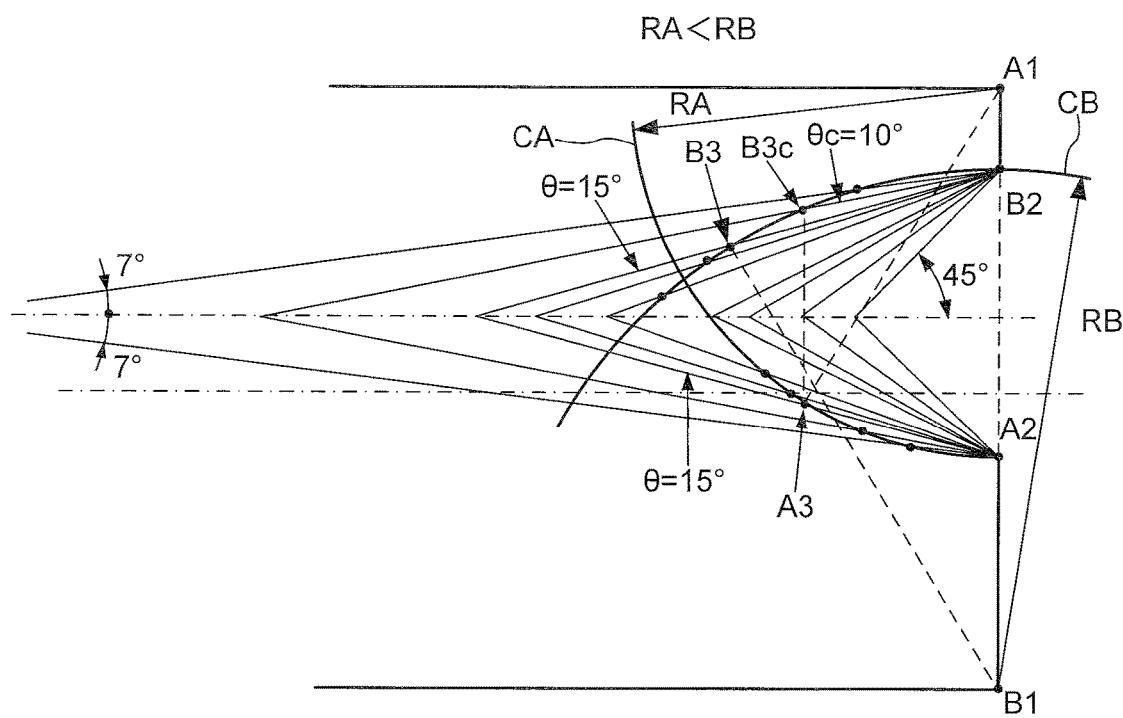

[FIG. 10]
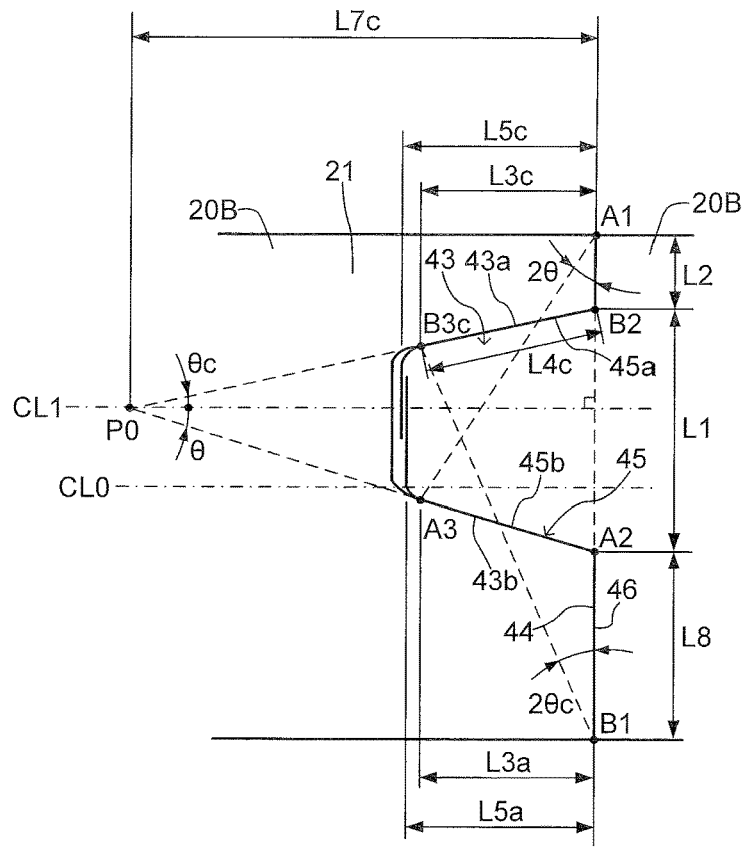
[FIG. 11]
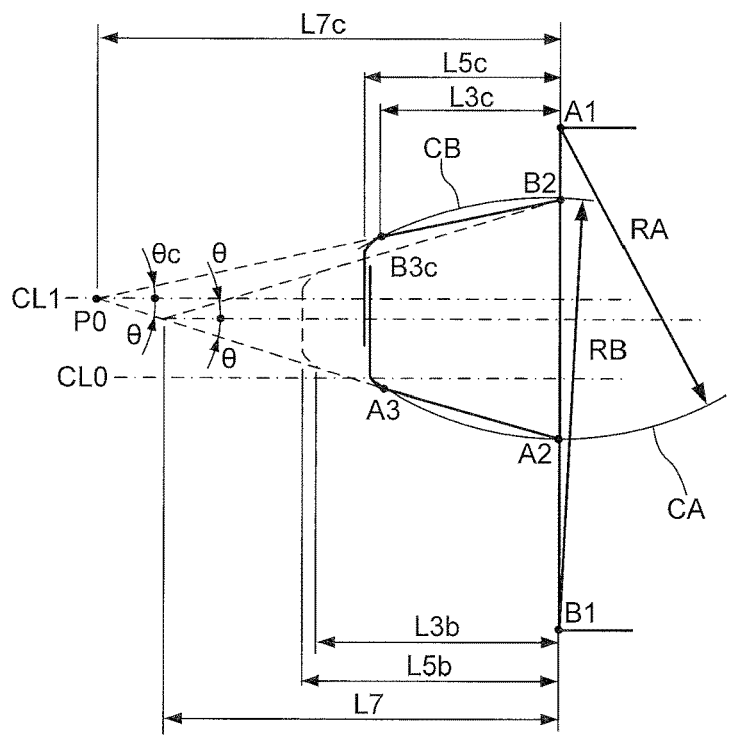

[FIG. 12]
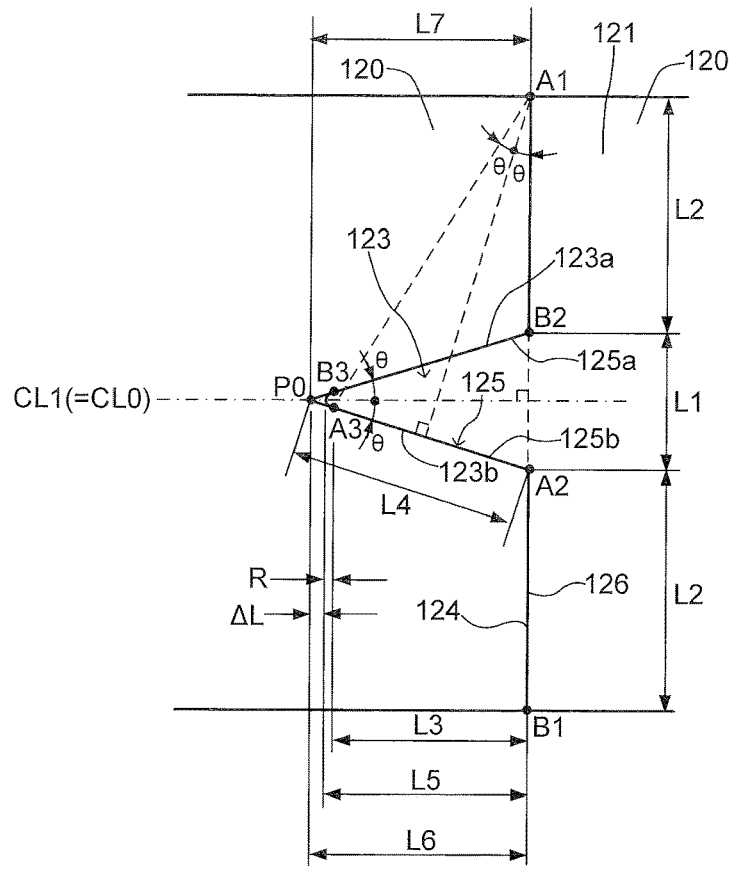
[FIG 13]
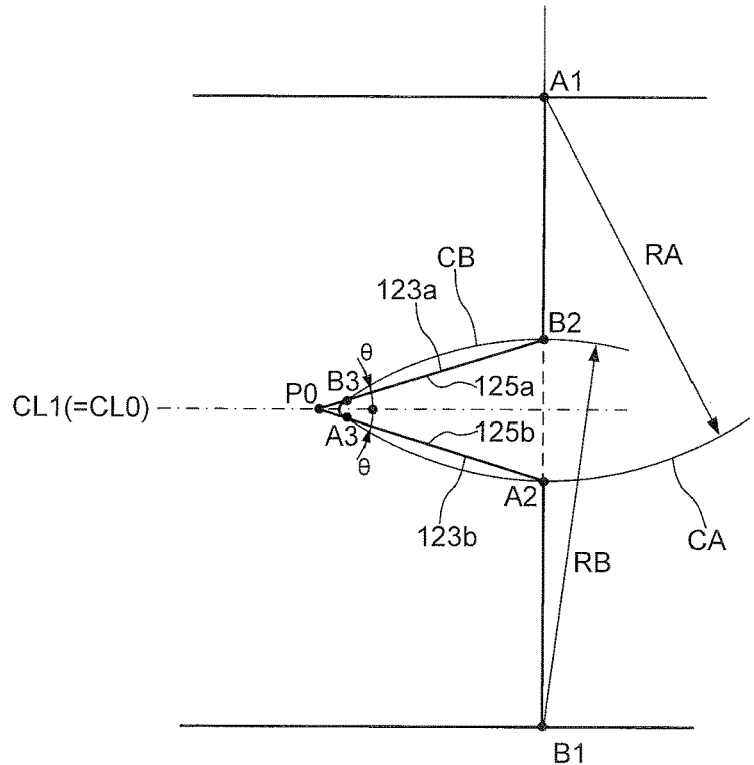

[FIG. 14]
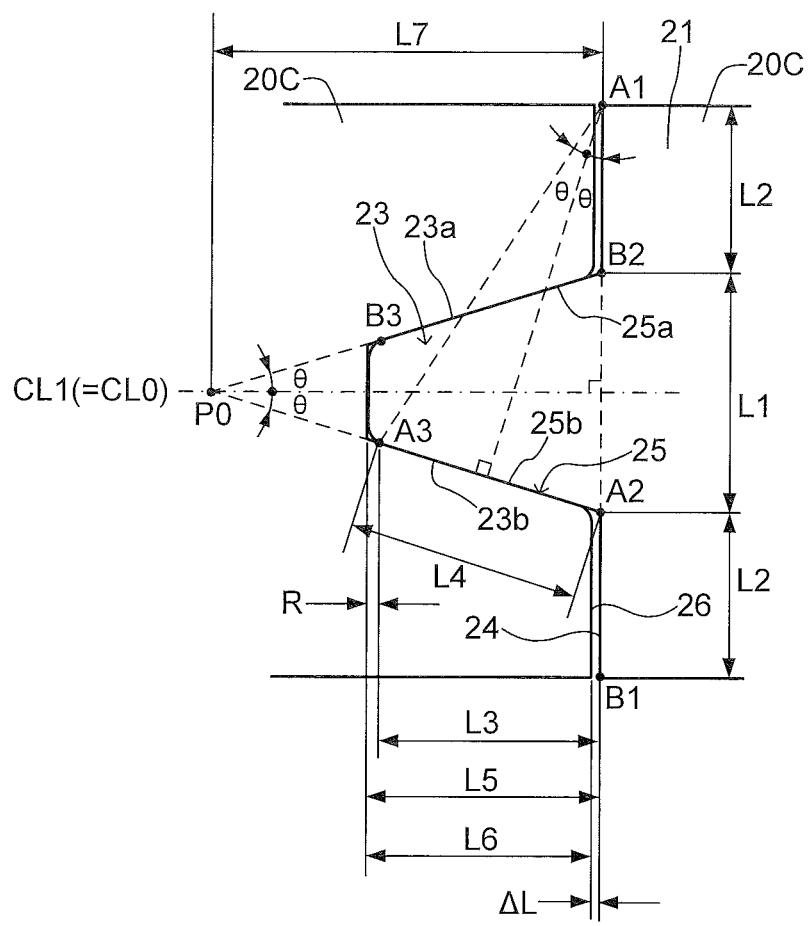

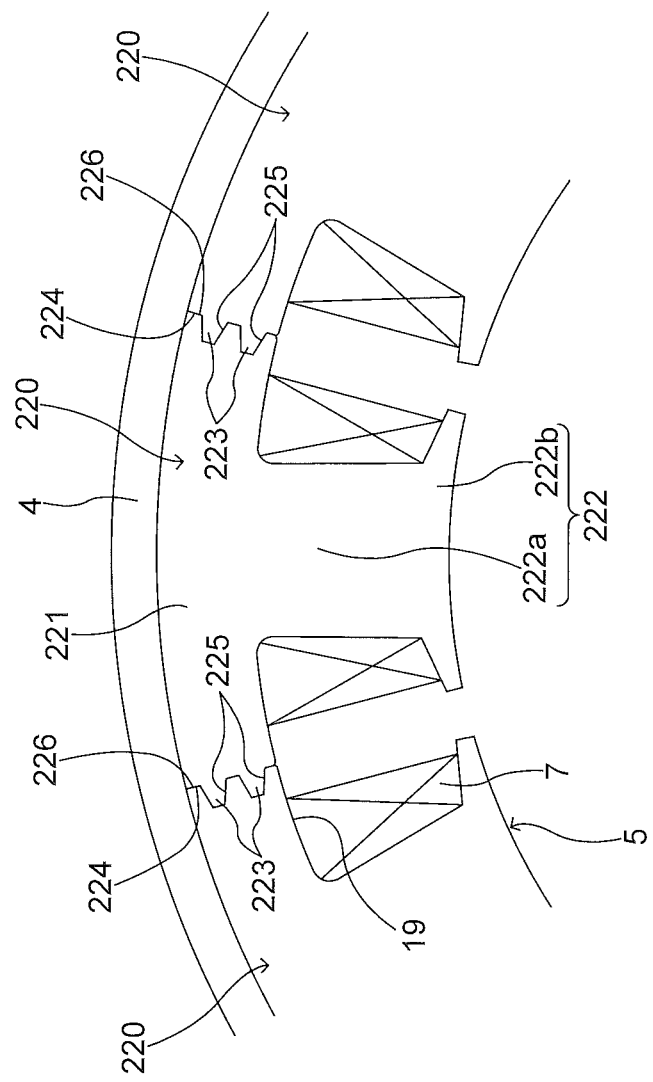
[FIG. 15]

[FIG. 16]
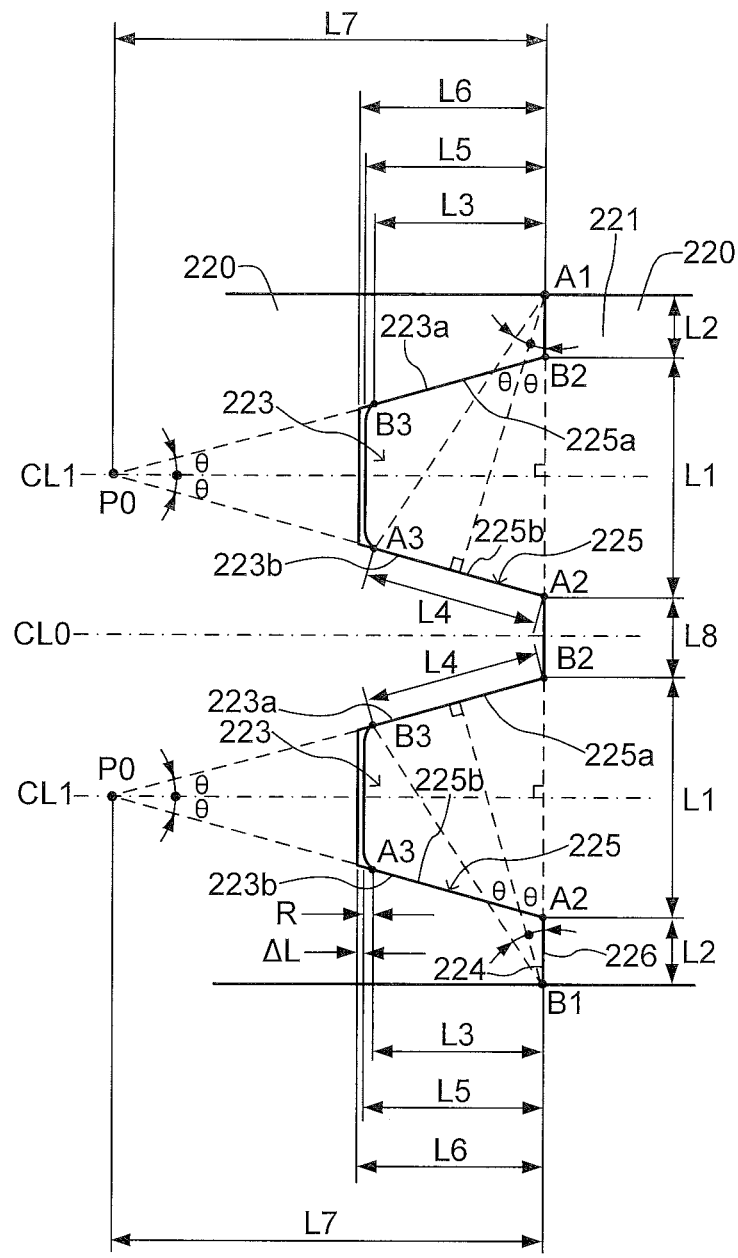

[FIG. 17]
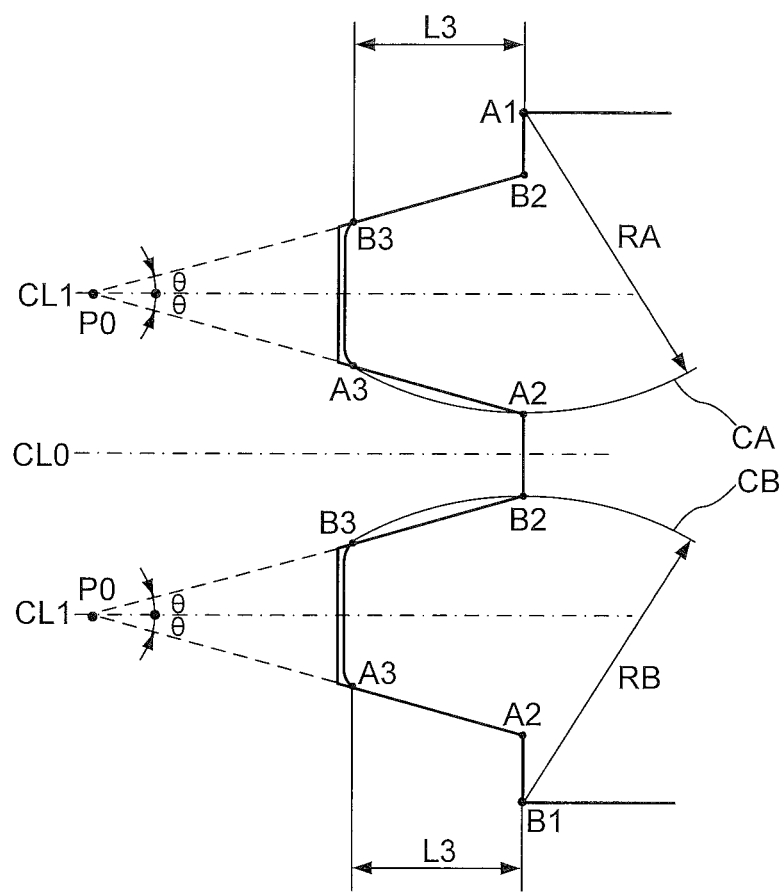

[FIG. 18]
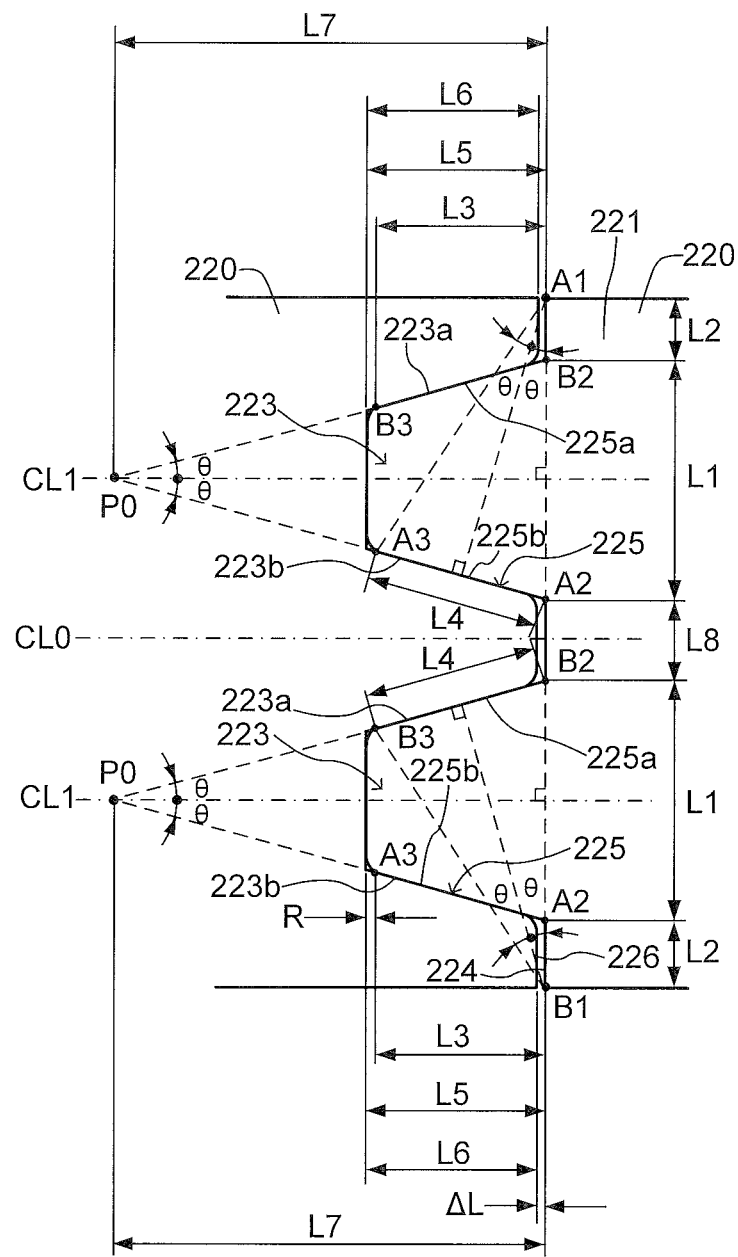

ROTATING ELECTRICAL MACHINE AND PRODUCING METHOD OF ROTATING ELECTRICAL MACHINE

CROSS-REFERENCE TO RELATED APPLICATION

This is a continuation application of PCT/JP2017/010748, filed Mar. 16, 2017, which was published under PCT article 21(2). The entire contents of this application are incorporated herein by reference.

BACKGROUND OF THE INVENTION

Technical Field

The disclosed embodiment relates to a rotating electrical machine and a producing method of the rotating electrical machine.

Description of Background Art

There is known a stator of a rotating electrical machine having a concave-convex part engaging with each other formed on an abutting portion of an adjacent laminated core.

SUMMARY OF THE INVENTION

According to one aspect of the present embodiment, there is provided a rotating electrical machine including a plurality of core pieces forming a stator core. Each of the core pieces includes contact surfaces along a radial direction relative to a rotation axis on one side end and another side end of the core piece in a peripheral direction around the rotation axis, a tapered protrusion on the contact surface of the one side end of the core piece, the protrusion including first inclined surfaces outside and inside in the radial direction, and a recess on the contact surface of the other side end of the core piece, the recess including second inclined surfaces contacting the first inclined surfaces outside and inside in the radial direction to receive the protrusion of adjacent core piece. A cross-sectional shape perpendicular to the rotation axis of the protrusion is a shape such that, inside a circle centered on a first end portion of one side in the radial direction of the contact surface with a distance being a radius between a second end portion on a tip side of the first inclined surface located on an opposite side of the first end portion on the protrusion and the first end portion, at least a part of the first inclined surfaces located on the opposite side of the first end portion contact the second inclined surfaces.

According to another aspect of the present embodiment, there is provided a rotating electrical machine including a plurality of core pieces forming a stator core. Each of the core pieces includes contact surfaces along a radial direction relative to a rotation axis on one side end and another side end of the core piece in a peripheral direction around the rotation axis, a tapered protrusion on the contact surface of the one side end of the core piece, the protrusion including first inclined surfaces outside and inside in the radial direction, and a recess on the contact surface of the other side end of the core piece, the recess including second inclined surfaces contacting the first inclined surfaces outside and inside in the radial direction to receive the protrusion of adjacent core piece. A cross-sectional shape perpendicular to the rotation axis of the protrusion is a shape such that, letting $L1$ be a dimension of a base end portion of the protrusion in the radial direction, $L2$ be an interval in the radial direction between a first end portion on one side of the contact surface in the radial direction and the protrusion, $L3$ be a protrusion dimension of the protrusion from the contact surface in a normal direction of the contact surface, and $\theta$ be an inclination angle between the normal direction and the first inclined surface located on an opposite side of the first end portion on the protrusion, $L3=(L1+L2)\sin 2\theta$ is satisfied.

According to another aspect of the present embodiment, there is provided a producing method of the rotating electrical machine. The rotating electrical machine includes a plurality of core pieces forming a stator core. Each of the core pieces includes contact surfaces along a radial direction relative to a rotation axis on one side end and another side end of the core piece in a peripheral direction around the rotation axis, a tapered protrusion on the contact surface of the one side end of the core piece, the protrusion including first inclined surfaces outside and inside in the radial direction, and a recess on the contact surface of the other side end of the core piece, the recess including second inclined surfaces contacting the first inclined surfaces outside and inside in the radial direction to receive the protrusion of adjacent core piece. A cross-sectional shape perpendicular to the rotation axis of the protrusion is a shape such that, inside a circle centered on a first end portion of one side in the radial direction of the contact surface with a distance being a radius between a second end portion on a tip side of the first inclined surface located on an opposite side of the first end portion on the protrusion and the first end portion, at least a part of the first inclined surfaces located on the opposite side of the first end portion contact the second inclined surfaces. The producing method includes forming a stator core by circularly coupling a plurality of core pieces, and fixing a frame to outside of the stator core by shrink fit.

According to another aspect of the present embodiment, there is provided a rotating electrical machine including a plurality of core pieces forming a stator core. Each of the core pieces includes contact surfaces along a radial direction relative to a rotation axis on one side end and another side end of the core piece in a peripheral direction around the rotation axis, a tapered protrusion on the contact surface of the one side end of the core piece, the protrusion including first inclined surfaces outside and inside in the radial direction, a recess on the contact surface of the other side end of the core piece, the recess including second inclined surfaces contacting the first inclined surfaces outside and inside in the radial direction to receive the protrusion of adjacent core piece, and means for preventing rotation of the protrusion relative to the recess, a first end portion outside or inside in the radial direction of the contact surface being a center of the rotation.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an axial cross-sectional view representing an example of the overall configuration of a rotating electrical machine according to a first embodiment;

FIG. 2 is a lateral cross-sectional view taken along the II-II section of FIG. 1 representing an example of the overall configuration of a rotating electrical machine according to the first embodiment;

FIG. 3 is an explanatory diagram representing a part extracted from a stator core;

FIG. 4 is an explanatory diagram representing an example of a cross-sectional shape perpendicular to a protrusion of a core piece and an axial direction of a recess;

FIG. 5 is an explanatory diagram representing that a first inclined surface of the protrusion abuts a second inclined surface of a recess inside a circle centered on a first end portion in the case that bending stress acts thereon;

FIG. 6 is an explanatory diagram representing an example of a setting condition of a contact angle θ;

FIG. 7 is an explanatory diagram representing an example of a cross-sectional shape perpendicular to a protrusion of a core piece and an axial direction of a recess in a second embodiment;

FIG. 8 is an explanatory diagram representing that a first inclined surface of the protrusion abuts a second inclined surface of a recess inside a circle centered on a first end portion in the case that bending stress acts thereon;

FIG. 9 is an explanatory diagram representing an example of a setting condition of a contact angle θ;

FIG. 10 is an explanatory diagram representing an example of a cross-sectional shape perpendicular to a protrusion of a core piece and an axial direction of a recess in a third embodiment;

FIG. 11 is an explanatory diagram representing that a first inclined surface of the protrusion abuts a second inclined surface of a recess inside a circle centered on a first end portion in the case that bending stress acts thereon;

FIG. 12 is an explanatory diagram representing an example of a cross-sectional shape perpendicular to a protrusion of a core piece and an axial direction of a recess in an exemplary modification in which the protrusion is triangular;

FIG. 13 is an explanatory diagram representing that a first inclined surface of the protrusion abuts a second inclined surface of a recess inside a circle centered on a first end portion in the case that bending stress acts thereon;

FIG. 14 is an explanatory diagram representing an example of a cross-sectional shape perpendicular to a protrusion of a core piece and an axial direction of a recess in an exemplary modification in which a gap is disposed between contact surfaces;

FIG. 15 is an explanatory diagram representing a part extracted from a stator core in a fourth embodiment;

FIG. 16 is an explanatory diagram representing an example of a cross-sectional shape perpendicular to a protrusion of a core piece and an axial direction of a recess;

FIG. 17 is an explanatory diagram representing that a first inclined surface of the protrusion abuts a second inclined surface of a recess inside a circle centered on a first end portion in the case that bending stress acts thereon; and FIG. 18 is an explanatory diagram representing an example of a cross-sectional shape perpendicular to a protrusion of a core piece and an axial direction of a recess in an exemplary modification in which a gap is disposed between contact surfaces.

DETAILED DESCRIPTION OF THE EMBODIMENTS

In the following, an embodiment will be described, referring to the drawings. Note that, for convenience of explaining the configuration of a rotating electrical machine or the like in the following, although there may be used directions such as top, bottom, right, left, front, back, or the like as appropriate, they are not intended to limit the positional relation of respective configurations of the rotating electrical machine or the like.

1. First Embodiment

A rotating electrical machine of a first embodiment will be described.

(1-1. An Overall Configuration of a Rotating Electrical Machine)

Referring to FIGS. 1 and 2, an example of the overall configuration of a rotating electrical machine 1 related to the present embodiment will be described. FIG. 1 is an axial cross-sectional view representing an example of the overall configuration of the rotating electrical machine 1. FIG. 2 is a lateral cross-sectional view taken along the II-II section of FIG. 1 representing an example of the overall configuration of the rotating electrical machine 1.

As illustrated in FIGS. 1 and 2, the rotating electrical machine 1 includes a stator 2, a rotor 3, a frame 4, a load-side bracket 11, and an opposite-to-load-side bracket 13. The rotating electrical machine 1 is used as a motor or a generator.

The rotor 3 has a shaft 10, a rotor core 15 disposed on the outer periphery of the shaft 10, and a plurality of permanent magnets (illustration omitted) provided on the rotor core 15. The rotor core 15, which includes a plurality of electromagnetic steel plates laminated in the axial direction, is provided in a manner facing the stator 2 in the radial direction.

The load-side bracket 11 is fixed to the load side of the frame 4 (right side in FIG. 1), whereas the opposite-to-load-side bracket 13 is fixed to the side opposite to the load of the frame 4 (left side in FIG. 1). The shaft 10 is supported in a manner freely rotatable around a rotation axis AX by a load-side bearing 12 disposed on the load-side bracket 11 and an opposite-to-load-side bearing 14 disposed on the opposite-to-load-side bracket 13.

Note that "load-side" in the present specification refers to a direction in which a load is attached to the rotating electrical machine 1, i.e., the direction in which the shaft 10 protrudes (rightward in FIG. 1) in the example, and "opposite-to-load-side" refers to a direction opposite to the load-side (leftward in FIG. 1).

In addition, "axial direction" in the present specification refers to a direction along the rotation axis AX of the shaft 10 (rotor 3), "peripheral direction" refers to a peripheral direction around the rotation axis AX, and "radial direction" refers to a radial direction centered on the rotation axis AX.

The stator 2 is disposed on the inner peripheral surface of the frame 4 in a manner facing the rotor 3 in the radial direction. The stator 2 has a stator core 5 disposed on the inner peripheral surface of the frame 4, a bobbin 6 attached to the stator core 5, windings 7 wound around the bobbin 6 and a resin portion 8. The bobbin 6 includes insulating material to electrically insulate the stator core 5 and the windings 7. Note that the bobbin 6 may be a sheet-shaped insulator.

As illustrated in FIG. 2, the stator core 5 includes a plurality (12 in the illustrated example) of core pieces 20 (also referred to as split cores) connected in the peripheral direction. Each of the core pieces 20 is formed by laminating, in the axial direction, a plurality of electromagnetic steel plates formed into a predetermined shape by press punching, for example. The core piece 20 has a generally arcuate yoke 21 and a tooth 22 integrally disposed on the yoke 21. The tooth 22 has a main body 22a disposed so as to protrude inward from the yoke 21 in the radial direction, and an enlarged-width portion 22b disposed on a tip of the inner periphery of the main body 22a, with the width being enlarged in the peripheral direction. Although, in the example illustrated in FIG. 2, the tips of adjacent ones of the enlarged-width portions 22b are separated in the peripheral direction, they may be in contact with each other.

After the bobbin 6 and the windings 7 have been attached to the tooth 22, each of the core pieces 20 is coupled in the peripheral direction so as to form the stator core 5. Then, after the stator core 5 has been fixed to the inner peripheral surface of the frame 4 by press fit or shrink fit, the stator core 5 is molded with resin. As a result, as illustrated in FIG. 1, the stator core 5 (core pieces 20), the bobbin 6, and the windings 7 turn out to be integrally fixed by a resin portion 8 composed of resin.

As illustrated in FIG. 2, the windings 7 attached to each of the teeth 22 is received in a slot 19 between the teeth 22 adjacent to each other in the peripheral direction, and the side portions facing each other of the winding layer of the windings 7 are provided in a manner spaced apart by a gap 19a. Resin is injected into the gap 19a at the time of molding, whereby the resin portion 8 is filled.

As illustrated in FIG. 1, a load-side end portion and an opposite-to-load-side end portion of the resin portion 8 respectively have generally circular protrusions 8a and 8b faulted thereon. The protrusions 8a are 8b are spigot-fitted to the load-side bracket 11 and the opposite-to-load-side bracket 13, respectively.

(1-2. General Configuration of Core Piece)

Next, referring to FIG. 3, an example of the general configuration of the core piece 20 will be described. FIG. 3 is an explanatory diagram representing a part extracted from the stator core 5. Note that illustration of the bobbin 6 and the resin portion 8 are omitted in FIG. 3.

As illustrated in FIG. 3, the core piece 20 has the arcuate yoke 21 and the tooth 22. The tooth 22 has the main body portion 22a and the enlarged-width portion 22b. Each of the core pieces 20 respectively has, on both end portions in the peripheral direction, contact surfaces 24 and 26 lying along the radial direction and contacting one of the adjacent core pieces 20. A protrusion 23 is disposed on the contact surface 24 of an end portion of one side in the peripheral direction (left side of FIG. 3), and a recess 25 is disposed on the contact surface 26 of an end portion of the other side in the peripheral direction (right side of FIG. 3). Each of the core pieces 20 adjacent to each other in the peripheral direction are coupled each other, in a state where the protrusion 23 of the adjacent core piece 20 is received in the recess 25, and the contact surfaces 24 and 26 are in contact with each other.

(1-3. Shape of Protrusion and Recess of Core Piece)

Next, referring to FIGS. 4 and. 5, an example of the shape of the protrusion 23 and the recess 25 of the core piece 20 will be described. FIG. 4 is an explanatory diagram representing an example of a cross-sectional shape perpendicular to a protrusion 23 of a core piece 20 and an axial direction of a recess 25. FIG. 5 is an explanatory diagram representing that a first inclined surface of the protrusion abuts a second inclined surface of a recess in the case that bending stress acts thereon.

As illustrated in FIG. 4, the protrusion 23 and the recess 25 are disposed on the central position in the radial direction of the yoke 21. In other words, a combined centerline CL1 of the protrusion 23 and the recess 25 generally coincides with a yoke centerline CL0 which is the centerline in the radial direction of the yoke 21. Note that the combined centerline CL1 is a line which passes through a reference position P0 intersected by the extended lines of first inclined surfaces 23a and 23b (second inclined surfaces 25a and 25b) described below, and which is parallel to the normal direction of the contact surfaces 24 and 26.

The protrusion 23, which is formed in a tapered shape such as an isosceles trapezoid with the width growing narrower in the radial direction in the present example, has the first inclined surfaces 23a and 23b outside and inside in the radial direction. The first inclined surfaces 23a and 23b are respectively inclined against the combined centerline CL1 by a contact angle θ.

The recess 25 is an isosceles trapezoidal recess with a generally same shape as the protrusion 23, and has the second inclined surfaces 25a and 25b outside and inside in the radial direction. The second inclined surfaces 25a and 25b are respectively inclined against the combined centerline CL1 by the contact angle θ. The recess 25 of the core piece 20 receives the protrusion 23 of the adjacent core piece 20 in a state where the second inclined surfaces 25a and 25b are respectively kept in contact with the first inclined surfaces 23a and 23b of the protrusion 23.

The cross-sectional shape perpendicular to the axial direction of the protrusion 23 is set as follows. Specifically, as illustrated in FIGS. 4 and 5, the protrusion 23 has a shape such that the first inclined surface 23b contacts the second inclined surface 25b inside a circle CA centered on a first end portion A1 outside the radial direction of the contact surface 24 with a distance RA being the radius between a second end portion A3 of the tip side of the first inclined surface 23b located on the opposite side of the first end portion A1 of the protrusion 23 and the first end portion A1. In addition, the protrusion 23 has a shape such that the first inclined surface 23a contacts the second inclined surface 25a inside a circle CB centered on the first end portion B1 inside the radial direction of the contact surface 24 with a distance RB being the radius between a second end portion B3 of the tip side of the first inclined surface 23a located on the opposite side of the first end portion B1 of the protrusion 23 and the first end portion B1.

Particularly, in the present example, a third end portion A2 on the base end side of the first inclined surface 23b of the protrusion 23 is located on the circumference of the circle CA. In addition, a third end portion B2 on the base end side of the first inclined surface 23a of the protrusion 23 is located on the circumference of the circle CB.

With the cross-sectional shape, the protrusion 23 may have a structure that suppresses generation of a gap between the contact surfaces 24 and 26 of the adjacent core piece 20, even in the case that a bending force acts thereon with the first end portion A1 or the first end portion B1 being the fulcrum, in a state where the protrusion 23 and the recess 25 are coupled each other. In the following, the cross-sectional shape will be described more specifically.

In the configuration in which the protrusion 23 and the recess 25 are combined, the fulcrum is either the first end portion A1 or the first end portion B1 when the contact surfaces 24 and 26 of the adjacent core pieces 20 are about to open. Considering the case of opening with the first end portion A1 being the fulcrum, it suffices to satisfy the following conditions to prevent the opening.

In FIG. 4, L1 denotes the dimension of the base end portion of the protrusion 23 in the radial direction (dimensions between the third end portions B2 and A2), and L2 denotes the intervals between the first end portions A1 and B1 and the protrusion 23 in the radial direction (interval between the first end portion A1 and the third end portion B2, interval between the first end portion B1 and the third end portion A2). In other words, L1+2L2 represents the thickness of the yoke 21 in the radial direction. Note that L1 and L2 are arbitrary lengths.

First, let us consider an isosceles triangle A1A2A3 with the first end portion A1 being its apex and L1+L2 being its one side. Using the contact angle θ, a length L4 of the base (line segment A2A3) of the isosceles triangle is given by:

$$L4=2(L1+L2)\sin\theta$$

A dimension parallel to the combined centerline CL1 of the base (line segment A2A3) of the isosceles triangle A1A2A3, i.e., a protrusion dimension L3 from the contact surfaces 24 and 26 of the protrusion 23 in the normal direction of the contact surfaces 24 and 26 is given by:

$$\begin{aligned}L3 &= L4\cos\theta\\ &= 2(L1+L2)\sin\theta\cos\theta\\ &= (L1+L2)\sin 2\theta\end{aligned}$$

The protrusion dimension L3 turns out to be the standard height of the protrusion 23. Note that actually a rounded corner formed by the press die is disposed on the tip of the protrusion 23, and therefore the actual height of the protrusion 23 turns out to be a dimension with a radius R of the corner added to L3. A protrusion dimension L5 in this case is given by:

$$L5=L3+\alpha R=(L1+L2)\sin 2\theta+\alpha R$$

Here, the coefficient α is provided taking into account the unevenness of dimension due to lamination of steel plates of the core piece 20, and it is preferred that there is an addition of about a few %-30% of the radius R (e.g., α≥1.3).

Therefore, "protrusion dimension from the contact surface of the protrusion" mentioned herein is intended to substantially include not only the protrusion dimension L3 but also the protrusion dimension L5.

On the other hand, a slight gap (about 10 μm, for example) is disposed between the tip portion of the protrusion 23 and the bottom of the recess 25 so as to ensure that the first inclined surfaces 23a and 23b contact the second inclined surfaces 25a and 25b, and the contact surface 24 contacts the contact surface 26. Therefore, a depth L6 from the contact surfaces 24 and 26 of the recess 25 is given by:

$$L6=L5+\Delta L$$

where ΔL is the gap.

Note that, a distance L7 of reference position P0 on the combined centerline CL1 from the contact surfaces 24 and 26 is given by:

$$L7=(L1/2)/\tan\theta$$

Here, drawing the circle CA centered on the first end portion A1 with the distance RA being the radius between the second end portion A3 and the first end portion A1 of the first inclined surface 23b results in the circle CA to pass outside the first inclined surface 23b (line segment A2A3), whereby the first inclined surface 23b abuts the second inclined surface 25b of the recess 25. Therefore, a configuration is realized which suppresses opening of the contact surface 24 and the contact surface 26 due to the bending stress with the first end portion A1 being the fulcrum, when the protrusion 23 is combined with the recess 25.

Additionally, in the present embodiment, the combined centerline CL1 of the protrusion 23 and the recess 25 is located on the yoke centerline CL0, and therefore the same goes for the bending stress with the first end portion B1 being the fulcrum. In other words, drawing the circle CB centered on the first end portion B1 with the distance RB between the second end portion B3 and the first end portion B1 of the first inclined surface 23a being the radius results in the circle CB to pass outside the first inclined surface 23a, whereby the first inclined surface 23a abuts the second inclined surface 25a of the recess 25. Therefore, a configuration which suppresses opening of the contact surface 24 and the contact surface 26 due to the bending stress with the first end portion B1 being the fulcrum is realized.

(1-4. Setting Condition of a Contact Angle θ)

Next, referring to FIG. 6, an example of the setting condition of a contact angle θ will be described. As has been described above, it is preferred that the contact angle θ is set so that the isosceles triangle A1A2A3 and an isosceles triangle B1B2B3 are formed, to prevent the combination of the protrusion 23 and the recess 25 from coming apart due to the bending stress.

In the example illustrated in FIG. 6, lines are drawn from the third end portions B2 and A2, respectively, with the contact angle θ being 45°, 40°, 30°, 27°, 20°, 17°, 15°, 10° and 7°, in the order starting from the right side of the figure. Provided that both the circle CA of the radius RA with the first end portion A1 being the fulcrum and the circle CB of the radius RB with the first end portion B1 being the fulcrum intersect with the lines of these contact angles, RA=RB=L1+L2 holds and it is possible to form the isosceles triangle A1A2A3 and the isosceles triangle B1B2B3, with L1+L2 being one side thereof.

In FIG. 6, the circle CB of the radius RB with the first end portion B1 being the fulcrum is illustrated. As illustrated in FIG. 6, the contact angle θ intersecting with the circle CB takes the values of 7°, 10°, 15°, 17° and 20°, and it is possible to form the isosceles triangle B1B2B3 in the case that the contact angle θ of the first inclined surface 23a is set within the angle range of 7°-20°. FIG. 6 illustrates the case that intersection with the circle CB is set on the second end portion B3 in the case that contact angle θ is set to 15°, for example. Similarly, setting the contact angle θ of the first inclined surface 23b within the angle range of 7°-20° allows for forming the isosceles triangle A1A2A3.

(1-5. Setting Condition of Contact Angle θ Based on Friction Coefficient of Steel Plate)

As has been described above, the core piece 20 is formed by laminating steel plates formed into a predetermined shape by press punching, for example. It is more preferred that the contact angle θ is set on the basis of the friction coefficient of the steel plate.

Specifically, in the case that a silicon steel plate with a thickness of 0.3 mm, 0.35 mm, 0.5 mm, for example, is used as the laminated steel plate, measurement of the friction coefficient in a direction perpendicular to the lamination direction of the silicon steel plate (surface direction) by the inventors resulted in a friction coefficient within a range of 0.167-0.308.

Here, the angle between a surface of an object on a slope and the horizontal direction immediately before the object starts sliding, i.e., the maximum friction angle θo is expressed by the following formula:

$$\text{friction coefficient}\,\mu=\tan\theta o$$

Substituting actual measurement values 0.167-0.308 of the friction coefficient μ into the formula gives:

$$\mu=0.167\text{--}0.308=\tan 9.5°\text{--}\tan 17.2°$$

whereby the maximum friction angle θo=9.5°-17.2°. In other words, it turns out that the maximum frictional force is obtained between the first inclined surfaces 23a and 23b, and the second inclined surfaces 25a and 25b, in the case that the contact angle θ of the first inclined surfaces 23a and 23b, and the second inclined surfaces 25a and 25b, is within a range of 9.5°-17.2°.

In the example illustrated in FIG. 6 described above, with the contact angle θ formed by intersection of the circle CA of the radius RA and the circle CB of the radius RB being within the range of 7°-20°, the contact angle of 7° results in a friction coefficient of tan 7°=0.1228, which is equal to or lower than the actual measurement value 0.167) (tan 9.5°) of the friction coefficient μ. In addition, the contact angle of 20° results in tan 20°=0.364, which is equal to or higher than the actual measurement value 0.308) (tan 17.2°) of the friction coefficient μ. Therefore, in the example illustrated in FIG. 6, it is preferable to set the contact angle θ within a range of 10°-17° (10°, 15° and 17°).

According to the foregoing description, setting the contact angle θ within a range of 9.5°-17.2° corresponding to the friction coefficient of the laminated silicon steel plate allows for preventing the engaging portion of the protrusion 23 and the recess 25 from moving due to magnetic vibration, impact or the like, for example, after shrink fitting the frame 4 to the circularly coupled core pieces 20.

(1-6. Manufacturing Method of Rotating Electrical Machine)

The rotating electrical machine 1 of the present embodiment is assembled generally in the following manner. After the bobbin 6 and the windings 7 have been attached to the tooth 22, each of the core pieces 20 is provided in a manner circularly coupled so as to faun the stator core 5. Then, the stator core 5 is fixed to the interior of the frame 4 by press fit, shrink fit, or the like. Subsequently, the stator core 5, the plurality of windings 7, or the like, attached to the stator core 5 are integrated in the resin portion 8. In this manner, the stator 2 is assembled.

Next, the load-side bracket 11 having the shaft 10 installed therein is fixed to the load side of the frame 4, while inserting the shaft 10 and the rotor 3 into the stator 2. Then, the opposite-to-load-side bracket 13 is fixed to the side opposite to the load of the frame 4, while press fitting the shaft 10 to the opposite-to-load-side bearing 14. As a result, assembly of the rotating electrical machine 1 is completed. Note that the order of assembling the load-side bracket 11 and the opposite-to-load-side bracket 13 may be reversed.

Note that the protrusion 23 and the recess 25 having the shape described above correspond to an exemplary means for preventing rotation of the protrusion relative to the recess, the first end portion outside or inside in the radial direction of the contact surface being the center of the rotation.

(1-7. Effect of First Embodiment)

According to the rotating electrical machine 1 of the present embodiment described above, the following effect is exhibited. In other words, in the rotating electrical machine 1 having the stator core 5 formed by a plurality of circularly coupled core pieces 20 and fixed inside the frame 4 by shrink fit or the like, an uneven compressive force may act on outer peripheral surfaces or contact surfaces of the core pieces 20 due to unevenness of the inner diameter or wall thickness of the frame 4, unevenness of the outer diameter of the core pieces 20, or the like. In the case that the level of the compressive force generates a bent in the circular shape of stator core 5, which leads to generation of a gap between the contact surfaces 24 and 26 of the core pieces 20, magnetic flux is prevented from passing through the stator core 5.

In the present embodiment, with the protrusion 23 and the recess 25 included in each of the core pieces 20 having the cross-sectional shape, it turns out that at least a part of the first inclined surfaces 23b and 23a on the opposite side of the first end portions A1 and B1 of the protrusion 23 abuts the second inclined surfaces 25b and 25a of the recess 25, even in the case that a bending force acts thereon with the first end portions A1 and B1 being the fulcrum, in a state where the protrusion 23 and the recess 25 are coupled each other. Therefore, it is possible to realize a structure which suppresses generation of a gap between the contact surfaces 24 and 26 of the adjacent core piece 20. As a result, it is possible to maintain the contact between the contact surfaces 24 and 26, and secure the magnetic path of the stator core 5.

In addition, the stiffness of the stator core 5 improves, whereby it is possible to set the interference between the frame 4 and the stator core 5 to an appropriate size without making it larger than necessary. As a result, the contact surfaces 24 and 26 of the core piece 20 do not significantly bend, and it is also possible to keep the gap between the stator 2 and the rotor 3 with a good precision and reduce cogging or magnetic noise. In addition, it is also possible to omit the molding process for reinforcing the stator 2. Furthermore, it is possible to increase the connection area of the yoke 21 between the adjacent core pieces 20, reducing iron loss thereby. As a result, heating of the rotating electrical machine may be reduced.

In addition, particularly in the present embodiment, the cross-sectional shape perpendicular to the axial direction of the protrusion 23 is a shape such that the third end portions A2 and B2 on the base end side of the first inclined surfaces 23b and 23a located on the opposite side of the first end portions A1 and B1 of the protrusion 23 are located on the circumference of the circles CA and CB.

As a result, it turns out that, in the case that bending force acts with the first end portions A1 and B1 being the fulcrum, in a case where the protrusion 23 and the recess 25 are coupled each other, the whole of the first inclined surfaces 23b and 23a on the opposite side of the first end portions A1 and B1 of the protrusion 23 abuts the second inclined surfaces 25b and 25a of the recess 25. Therefore, it is possible to realize a structure which further suppresses generation of a gap between the contact surfaces 24 and 26 of the adjacent core piece 20.

In addition, particularly in the present embodiment, the core piece 20 is formed by laminating a plurality of steel plates, and the cross-sectional shape perpendicular to the axial direction of the protrusion 23 is a shape such that the contact angle θ of the first inclined surfaces 23a and 23b relative to the normal direction of the contact surfaces 24 and 26 is set on the basis of the friction coefficient μ of the steel plate.

As a result, it is possible to increase the frictional force between the first inclined surfaces 23a and 23b of the protrusion 23 and the second inclined surfaces 25a and 25b of the recess 25, whereby it is possible to realize a structure which further suppresses movement of the protrusion 23 and the recess 25 from their coupled state. Therefore, it is possible to realize a structure which further suppresses generation of a gap between the contact surfaces 24 and 26 of the adjacent core piece 20.

2. Second Embodiment

Next, a second embodiment will be described. The second embodiment is an embodiment in which the protrusion and the recess are provided more outward than the yoke centerline CL0 in the radial direction.

(2-1. Shape of Protrusion and Recess of Core Piece)

Referring to FIGS. 7 and 8, an example of the shape of a protrusion 33 and a recess 35 of a core piece 20A of the present embodiment will be described. As illustrated in FIGS. 7 and 8, the core piece 20A in the present embodiment has the protrusion 33 on a contact surface 34 along the radial direction of the end portion of one side in the peripheral direction, and has the recess 35, which receives the protrusion 33 of the adjacent core piece 20A, on a contact surface 36 along the radial direction of the end portion of the other side in the peripheral direction.

The protrusion 33, which is formed in an isosceles trapezoidal shape similarly to the first embodiment described above, has first inclined surfaces 33a and 33b outside and inside in the radial direction. The first inclined surfaces 33a and 33b are respectively inclined against the combined centerline CL1 by the contact angle θ. Note that the combined centerline CL1 in the present embodiment is a line which passes through the reference position P0 intersected by the extended line of the first inclined surfaces 33a and 33b (second inclined surfaces 35a and 35b), and which is parallel to the normal direction of the contact surfaces 34 and 36.

The recess 35 is an isosceles trapezoidal recess which has generally the same shape as the protrusion 33, and has the second inclined surfaces 35a and 35b outside and inside in the radial direction. The second inclined surfaces 35a and 35b are respectively inclined against the combined centerline CL1 by the contact angle θ. The recess 35 of the core piece 20A receives the protrusion 33 of the adjacent core piece 20A in a state where the second inclined surfaces 35a and 35b are respectively in contact with the first inclined surfaces 33a and 33b of the protrusion 33.

The protrusion 33 and the recess 35 in the present embodiment are provided outward in the radial direction of the contact surfaces 34 and 36, and the combined centerline CL1 of the protrusion 33 and the recess 35 is located more outward than the yoke centerline CL0 in the radial direction.

In the present embodiment, as illustrated in FIGS. 7 and 8, the cross-sectional shape perpendicular to the axial direction of the protrusion 33 is a shape such that the third end portion B2 on the base end side of the first inclined surface 33a located outside in the radial direction of the protrusion 33 is located on the circumference of the circle CB centered on the first end portion B1 inside in the radial direction of the contact surfaces 34 and 36 with the distance RB being the radius between the second end portion B3 and the first end portion B1 on the tip portion side of the first inclined surface 33a.

Also in the configuration of the core pieces 20A as described above, the fulcrum is either the first end portion A1 on one side or the first end portion B1 on the other side when the contact surfaces 34 and 36 of the adjacent core pieces 20A are about to open. Assuming the case of opening with the first end portion A1 being the fulcrum, it suffices to satisfy the following conditions to prevent the opening.

Let L1 be the dimension of the base end portion of the protrusion 33 in the radial direction (dimension between the third end portions B2 and A2), L2 be the interval between the first end portion B1 and the protrusion 33 in the radial direction, and L8 be the interval between the first end portion A1 and the protrusion 33 in the radial direction (L8>L2). In other words, L1+L2+L8 represents the thickness of the yoke 21 in the radial direction. Note that L1, L2 and L8 are arbitrary lengths.

Let us consider the isosceles triangle A1A2A3 with the first end portion A1 being its apex and L1+L2 being its one side. Similarly to the first embodiment, protrusion dimensions L3a and L5a of a virtual protrusion (indicated by the dashed line in FIG. 7) of this case are given by:

$$L4a = 2(L1+L2)\sin\theta$$

$$L3a = L4a \times \cos\theta$$
$$= 2(L1+L2)\sin\theta\cos\theta$$
$$= (L1+L2)\sin 2\theta$$

$$L5a = L3a + \alpha R = (L1+L2)\sin 2\theta + \alpha R$$

Next, assuming a case that the contact surfaces 34 and 36 are about to open with the first end portion B1 being the fulcrum, the following formulas hold, considering the isosceles triangle B1B2B3 in a similar manner.

$$L4b = 2(L1+L8)\sin\theta$$

$$L3b = (L1+L8)\sin 2\theta$$

$$L5b = (L1+L8)\sin 2\theta + \alpha R$$

In this case, the distance L7 from the contact surfaces 34 and 36 of the reference position P0 is similar to that in the first embodiment and given by:

$$L7 = (L1/2)/\tan\theta.$$

In the above example, L2<L8 holds, and therefore L3a<L3b (L5a<L5b) holds. Therefore, as illustrated in FIG. 8, the circle CB whose radius is the distance RB with the first end portion B1 being the fulcrum has a longer radius than that of the circle CA whose radius is the distance RA with the first end portion A1 being the fulcrum. In the present embodiment, the protrusion height L3b (or L5b) of the protrusion 33 capable of maintaining the dimension of the distance RB is determined to be the protrusion dimension of the protrusion 33. Assuming that the protrusion height L3a (or L5a) is the protrusion dimension, although the whole of the first inclined surface 33b may be accommodated within the circle CA centered on the first end portion A1 with the distance RA being the radius, only a part of the first inclined surface 33a may be accommodated within a circle (illustration omitted) centered on the first end portion B1 with the line segment B1B3' being the radius. In contrast, assuming the protrusion height L3b (or L5b) to be the protrusion dimension, it turns out that the whole of the first inclined surface 33b is accommodated within a circle (illustration omitted) centered on the first end portion A1 with the line segment A1A3' being the radius, and also the whole of the first inclined surface 33a is accommodated within the circle CB centered on the first end portion B1 with the distance RB being the radius. Therefore, a configuration which suppresses opening of the first inclined surfaces 33a and 33b, and the second inclined surfaces 35a and 35b, and also for the contact surface 34 and the contact surface 36, due to the bending stress with any of the first end portion A1 and the first end portion B1 being the fulcrum, is realized.

(2-2. Setting Condition of Contact Angle θ)

Next, referring to FIG. 9, an example of the setting condition of the contact angle θ will be described. In the example illustrated in FIG. 9, lines are drawn from the third end portions B2 and A2, respectively, with the contact angle θ being 45°, 40°, 30°, 27°, 20°, 17°, 15°, 10° and 7°, in the order starting from the right side of the figure, similarly to FIG. 6 described above. Provided that both the circle CA of the radius RA (=L1+L2) with the first end portion A1 being the fulcrum and the circle CB of the radius RB (=L1+L8) with the first end portion B1 being the fulcrum intersect with the lines of these contact angles, it is possible to form the isosceles triangle A1A2A3 with one side being L1+L2 and the isosceles triangle B1B2B3 with one side being L1+L8. In the example illustrated in FIG. 9, both the circle CA and the circle CB intersect at angles of 7°, 10°, 15°, 17° and 20°. In other words, setting the contact angle θ of the first inclined surfaces 33a and 33b within the angle range of 7°-20° allows for forming the isosceles triangle A1A2A3 and the isosceles triangle B1B2B3. Note that FIG. 9 illustrates the intersection with the circle CA as the second end portion A3, and the intersection with the circle CB as the second end portion B3 in the case that contact angle θ is set to 15°, for example. In the present embodiment, the position of the second end portion B3 turns out to be the standard of the protrusion dimension of the protrusion 33 as described above.

Note that the components of the core piece 20A other than those described above are similar to those of the core piece 20 described above. In addition, although the case in which the protrusion 33 and the recess 35 are provided more outward than the yoke centerline CL0 in the radial direction has been described above, they may be provided inward in the radial direction.

(2-3. Effect of Second Embodiment)

According to the second embodiment described above, the following effect is exhibited. Specifically, the density of the magnetic flux passing through the yoke 21 of the core piece 20A is generally higher inside than outside in the radial direction. Therefore, providing the protrusion 33 and the recess 35 outward in the radial direction on the contact surfaces 34 and 36 allows for expanding the magnetic path and enhancing the effect of reducing the iron loss.

In this case, the circle CB centered on the first end portion B1 inside in the radial direction has a larger radius than the circle CA centered on the first end portion A1 outside in the radial direction of the contact surface 34. In the present embodiment, the protrusion 33 has the cross-sectional shape, which turns out to be the shape corresponding to the circle CB with a larger radius. As a result, it is possible to realize a structure such that, both in the case that a bending force acts with the first end portion A1 outside in the radial direction being the fulcrum, and the case that a bending force acts with the first end portion B1 inside in the radial direction being the fulcrum, the whole of the first inclined surfaces 33b and 33a abuts the second inclined surfaces 35b and 35a of the recess 35 within a circle (the circle centered on the first end portion A1 with the line segment A1A3' being the radius, the circle CB centered on the first end portion B1 with the distance RB being the radius). Therefore, it is possible to realize a structure which suppresses generation of a gap between the contact surfaces 34 and 36 of the adjacent core piece 20A. As a result, it is possible to maintain the contact between the contact surfaces 34 and 36, and secure the magnetic path of the stator core 5.

3. Third Embodiment

Next, a third embodiment will be described. The third embodiment is an embodiment in which the protrusion dimension of the protrusion is reduced in comparison with the second embodiment, while providing the protrusion and the recess more outward than the yoke centerline CL0 in the radial direction.

(3-1. Shape of Protrusion and Recess of Core Piece)

Next, referring to FIGS. 10 and 11, an example of the shape of a protrusion 43 and a recess 45 of a core piece 20B of the present embodiment will be described. As illustrated in FIGS. 10 and 11, the core piece 20B in the present embodiment has the protrusion 43 on a contact surface 44 along the radial direction of the end portion of one side in the peripheral direction, and has the recess 45, which receives the protrusion 43 of the adjacent core piece 20B, on a contact surface 46 along the radial direction of the end portion of the other side in the peripheral direction.

The protrusion 43, which is formed in a trapezoidal shape, has first inclined surfaces 43a and 43b outside and inside in the radial direction. The first inclined surface 43a is inclined against the combined centerline CL1 by a contact angle θc, and the first inclined surface 43b is inclined against the combined centerline CL1 by the contact angle θ. Note that the combined centerline CL1 in the present embodiment is a line which passes through the reference position P0 intersected by the extended lines of the first inclined surfaces 43a and 43b (second inclined surfaces 45a and 45b), and which is parallel to the normal direction of the contact surfaces 44 and 46.

The recess 45 is a trapezoidal recess which has generally the same shape as the protrusion 43, and has the second inclined surfaces 45a and 45b outside and inside in the radial direction. The second inclined surfaces 45a is inclined against the combined centerline CL1 by the contact angle θc, and the second inclined surfaces 45b is inclined against the combined centerline CL1 by the contact angle θ. The recess 45 of the core piece 20B receives the protrusion 43 of the adjacent core piece 20B in a state where the second inclined surfaces 45a and 45b are respectively in contact with the first inclined surfaces 43a and 43b of the protrusion 43.

The protrusion 43 and the recess 45 in the present embodiment are provided outward in the radial direction of the contact surfaces 44 and 46, and the combined centerline CL1 of the protrusion 43 and the recess 45 is located more outward than the yoke centerline CL0 in the radial direction.

In the present embodiment, as illustrated in FIGS. 10 and 11, the cross-sectional shape perpendicular to the axial direction of the protrusion 43 is a shape such that the contact angle θc of the first inclined surface 43a located outside in the radial direction of the protrusion 43 is smaller than the contact angle θ of the first inclined surface 43b located inside in the radial direction of the protrusion 43.

Also in the configuration of the core pieces 20B as described above, the fulcrum is either the first end portion A1 on one side or the first end portion B1 on the other side when the contact surfaces 44 and 46 of the adjacent core pieces 20B are about to open. Let us consider the isosceles triangle A1A2A3 (apex angle 2θ) with the first end portion A1 being its apex, and the isosceles triangle B1B2B3c (apex angle 2θc) with the first end portion B1 being its apex.

The dimensions L3a and L5a calculated from the isosceles triangle A1A2A3 are similar to those in FIG. 7. On the other hand, with regard to the isosceles triangle B1B2B3c with the first end portion B1 being its apex, the dimensions L1 and L8 are the same as those in FIG. 7, with the contact angle being θc<θ, and therefore the protrusion dimensions L3c and L5c of the protrusion 43 are calculated by the same formula as in the case of FIG. 7:

$$L4c = 2(L1 + L8)\sin\theta c$$

$$L3c = L4c \times \cos\theta$$
$$= 2(L1 + L8)\sin\theta c \times \cos\theta c$$
$$= (L1 + L8)\sin 2\theta c$$

$$L5c = (L1 + L8)\sin 2\theta c + \alpha R$$

Since θ>θc holds, sin 2θ>sin 2θc holds. Therefore, as illustrated in FIG. 11, the protrusion dimension L3c (L5c) of the protrusion 43 turns out to be L3c<L3b (L5c<L5b) in comparison with the protrusion dimension L3b (L5b) of the protrusion 33 of FIG. 7. In other words, it is possible to make the protrusion dimension of the protrusion 43 smaller than the case of the protrusion 33 of FIG. 7. In this manner, it is possible to adjust the position of the tip of the protrusion 43 by changing the contact angle θc of the first inclined surface 43a. Therefore, θc may be set so that, for example, the protrusion dimension L3c (L5c) becomes equal to the protrusion dimension L3a (L5a).

On this occasion, letting L7c be the distance from the contact surfaces 44 and 46 of the reference position P0, the following holds.

$$L7c = L1/(\tan\theta + \tan\theta c)$$

The distance L7c in this case turns out to be larger than L7=(L1/2)/tan θ in case of FIG. 7.

(3-2. Setting Condition of Contact Angle θ)

Next, referring to FIG. 9 described above, an example of the setting condition of the contact angle θ will be described. As illustrated in FIG. 9, the second end portion B3 is located closer to the tip side from the contact surfaces 44 and 46 than the second end portion A3. This indicates the state of FIG. 7. In the case that it is desired to make the protrusion dimension smaller than that of the protrusion 33 of FIG. 7, it suffices to provide a configuration such as the core piece 20B of FIG. 10. In the example illustrated in FIG. 9, it is the line of the contact angle of 10° that intersects with the circle CB at a protrusion position approximately the same as the second end portion A3 which is the intersection between the line of the contact angle of 15° and the circle CA. Therefore, setting the contact angle θc to be about 10° allows for making the protrusion dimension L3c (L5c) generally equal to the protrusion dimension L3a (L5a).

Note that the components of the core piece 20B other than those described above are similar to those of the core piece 20A described above.

(3-3. Effect of Third Embodiment)

According to the third embodiment described above, the following effect is exhibited. In other words, there may be a case that it is desired to limit the protrusion dimension of the protrusion 43 from the contact surfaces 44 and 46 within a predetermined dimension depending on structural factors of the core piece 20B (e.g., proportion with the dimension of the yoke 21 of the core piece 20B in the radial direction, etc.).

In the present embodiment, with the protrusion 43 having the cross-sectional shape, it is possible to realize a structure such that, both in the case that a bending force acts with the first end portion A1 outside in the radial direction being the fulcrum, and the case that a bending force acts with the first end portion B1 inside in the radial direction being the fulcrum, the whole of the first inclined surfaces 43b and 43a abuts the second inclined surfaces 45b and 45a of the recess 45 within circles (the circle CA centered on the first end portion A1 with the distance RA being the radius and the circle CB centered on the first end portion B1 with the distance RB being the radius). Therefore, it is possible to realize a structure which suppresses generation of a gap between the contact surfaces 44 and 46 of the adjacent core piece 20B. As a result, it is possible to maintain the contact between the contact surfaces 44 and 46, and secure the magnetic path of the stator core 5. In addition, it is possible to adjust the position of the tip of the protrusion 43 (protrusion dimension) by adjusting the contact angle θc, and therefore it is possible to reduce the protrusion dimension of the protrusion 43 from the contact surfaces 44 and 46. Therefore, it is possible to satisfy the needs.

4. Exemplary Modification

Note that the disclosed embodiments are not limited to those described above, and a variety of variations are possible within a range that does not deviate from the spirit and technical concept thereof. In the following, such an exemplary modification will be described.

(4-1. Case That Protrusion and Recess Are Triangular)

Although the case that the protrusion and the recess are generally trapezoidal has been described above, the shape of the protrusion and the recess may be generally triangular. Referring to FIGS. 12 and 13, an example of the shape of the protrusion and the recess of the core piece in the exemplary modification will be described.

As illustrated in FIG. 12, a core piece 120 in the exemplary modification has a protrusion 123 on a contact surface 124 along the radial direction of the end portion of one side in the peripheral direction, and has a recess 125, which receives the protrusion 123 of the adjacent core piece 120, on a contact surface 126 along the radial direction of the end portion of the other side in the peripheral direction. The protrusion 123 and the recess 125 are disposed on the central position in the radial direction of a yoke 121. In other words, the combined centerline CL1 generally coincides with the yoke centerline CL0.

The protrusion 123, which is formed in a generally isosceles triangular shape, has first inclined surfaces 123a and 123b outside and inside in the radial direction. The first inclined surfaces 123a and 123b are respectively inclined against the combined centerline CL1 by the contact angle θ.

The recess 125 is an isosceles triangular recess with generally the same shape as the protrusion 123, and has second inclined surfaces 125a and 125b outside and inside in the radial direction. The second inclined surfaces 125a and 125b are respectively inclined against the combined centerline CL1 by the contact angle θ. The recess 125 of the core piece 120 receives the protrusion 123 of the adjacent core piece 120 in a state where the second inclined surfaces 125a and 125b are respectively in contact with the first inclined surfaces 123a and 123b of the protrusion 123.

The cross-sectional shape perpendicular to the axial direction of the protrusion 123 is set as follows. Specifically, as illustrated in FIGS. 12 and 13, the protrusion 123 has a shape such that the first inclined surface 123b contacts the second inclined surface 125b inside the circle CA centered on the first end portion A1 outside in the radial direction of the contact surface 124 with the distance RA being the radius between a second end portion A3 of the tip side of the first inclined surface 123b located on the opposite side of the first end portion A1 of the protrusion 123 and the first end portion A1. In addition, the protrusion 123 has a shape such that the first inclined surface 123 contacts the second inclined surface 125a inside the circle CB centered on the first end portion B1 inside in the radial direction of the contact surface 124 with the distance RB being the radius between the second end portion B3 of the tip side of the first inclined surface 123a located on the opposite side of the first end portion B1 of the protrusion 123 and the first end portion B1.

Particularly, in the present example, the third end portion A2 on the base end side of the first inclined surface 123b of the protrusion 123 is located on the circumference of the circle CA. In addition, the third end portion B2 on the base end side of the first inclined surface 123a of the protrusion 123 is located on the circumference of the circle CB.

With the cross-sectional shape, the protrusion 123 may have a structure that suppresses generation of a gap between the contact surfaces 124 and 126 of the adjacent core piece 120, even in the case that a bending force acts thereon with the first end portion A1 or the first end portion B1 being the fulcrum, in a state where the protrusion 123 and the recess 125 are coupled each other.

Note that, since the relation between respective dimensions L1-L7 for preventing the contact surfaces 124 and 126 from opening in the exemplary modification is similar to that in the first embodiment described above, explanation thereof is omitted. Additionally, in the exemplary modification, the protrusion 123 and the recess 125 may be provided more outward or inward than the yoke centerline CL0 in the radial direction, similarly to the second and the third embodiments described above.

(4-2. Case of Disposing a Gap Between Contact Surfaces)

Although a case that the contact surface 24 and the contact surface 26 of the adjacent core piece 20 contact each other has been described above as an example, there may be a configuration in which a slight gap is disposed between the contact surface 24 and the contact surface 26 to mitigate the compressive force acting on the contact surfaces. Referring to FIG. 14, an example of the shape of the protrusion and the recess of the core piece in the exemplary modification will be described.

As illustrated in FIG. 14, in the exemplary modification, a slight gap (around dozens μms, for example) is disposed between the contact surface 24 and the contact surface 26 of the adjacent core piece 20C. In other words, a "contact surface" in the present specification is not necessarily limited to a surface that comes in contact, but may include a surface provided via such a slight gap, suggesting the possibility of coming into contact. On the other hand, the tip portion of the protrusion 23 is in contact with the bottom of the recess 25. The depth L6 of the recess 25 from the contact surface 26 is given by:

$$L6=L5-\Delta L$$

where ΔL is the gap.

It is preferred that the gap ΔL is set to an appropriate value in accordance with the size of interference when shrink fitting the frame 4 to the circularly coupled core pieces 20C, the circularity of the inner diameter of the frame 4, the tip shape of the tooth 22, or the like (the same goes for the ΔL illustrated in FIG. 4 described above).

Note that, since the relation between respective dimensions L1-L7 (except L6) in the exemplary modification is similar to that in the first embodiment described above, explanation thereof is omitted.

According to the exemplary modification, it is possible to realize a structure that suppresses variation of the gap ΔL between the contact surfaces 24 and 26 of the adjacent core piece 20C, even in the case that a bending force acts thereon with the first end portions A1 and B1 being the fulcrum, in a state where the protrusion 23 and the recess 25 are coupled each other. In addition, the gap ΔL is preliminarily disposed and therefore it is possible to mitigate the compressive force acting on the contact surfaces 24 and 26.

(4-3. Others)

Although a case has been described above in which the contact angle θ is set so that the isosceles triangle A1A2A3 and the isosceles triangle B1B2B3 are formed, the shape of the protrusion and the recess is not limited thereto. Even in the case that such an isosceles triangle is not formed, it is possible to realize a structure that suppresses generation of a gap between the contact surfaces 24 and 26 of the adjacent core piece 20 against a bending force with the first end portion A1 being the fulcrum, provided that the cross-sectional shape of the protrusion 23 is such that at least a part of the first inclined surface 23b contacts the second inclined surface 25b inside the circle CA centered on the first end portion A1 with the distance RA being the radius. In addition, it is possible to realize a structure that suppresses generation of a gap between the contact surfaces 24 and 26 of the adjacent core piece 20 against a bending force with the first end portion B1 being the fulcrum, provided that the cross-sectional shape of the protrusion 23 is such that at least a part of the first inclined surface 23a contacts the second inclined surface 25a inside the circle CB centered on the first end portion B1 with the distance RB being the radius.

5. Fourth Embodiment

Next, a fourth embodiment will be described. The fourth embodiment is an embodiment in which the contact area between each of the core pieces is increased by disposing a plurality of protrusions and recesses on each of the core pieces.

(5-1. General Configuration of Core Piece)

Referring to FIG. 15, an example of the general configuration of a core piece 220 of the present embodiment will be described. FIG. 15 is an explanatory diagram representing a part extracted from the stator core 5. Note that illustration of the bobbin 6 and the resin portion 8 are omitted in FIG. 15.

As illustrated in FIG. 15, the core piece 220 has an arcuate yoke 221 and a tooth 222. The tooth 222 has a main body portion 222a and an enlarged-width portion 222b. Each of the core pieces 220 respectively has, on both end portions in the peripheral direction, contact surfaces 224 and 226 lying along the radial direction contacting the adjacent core piece 220. Two protrusions 223 are disposed on the contact surface 224 of an end portion of one side in the peripheral direction (left side of FIG. 15), and two recesses 225 are disposed on the contact surface 226 of an end portion of the other side in the peripheral direction (right side of FIG. 15). The core pieces 220 adjacent to each other in the peripheral direction are coupled each other, in a state where the two protrusions 223 of the adjacent core piece 220 are received in the two recesses 225, and the contact surfaces 224 and 226 are in contact with each other.

(5-2. Shape of Protrusion and Recess of Core Piece)

Next, referring to FIGS. 16 and 17, an example of the shape of the protrusions 223 and the recesses 225 of the core piece 220 will be described.

As illustrated in FIG. 16, the two protrusions 223, which respectively have the same shape and the same size, are symmetrically disposed about the yoke centerline CL0 in the radial direction. Similarly, also the two recesses 225, which respectively have the same shape and the same size, are symmetrically disposed about the yoke centerline CL0 in the radial direction. In the following, for convenience of explanation, the protrusion 223 and the recess 225 located outside in radial direction are also referred to as "external protrusion 223" and "external recess 225", and the protrusion 223 and the recess 225 located inside in the radial direction are also referred to as "internal protrusion 223" and "internal recess 225".

In FIG. 16, L1 denotes respective dimensions of the base end portions of the external protrusion 223 and the internal protrusion 223 in the radial direction (the dimension between the third end portions B2 and A2), L2 denotes respective intervals between the first end portions A1 and B1, and each of the protrusions 223 in the radial direction (the interval between the first end portion A1 and the third end portion B2 of the external protrusion 223, and the interval between the first end portion B1 and the third end portion A2 of the internal protrusion 223), and L8 denotes the interval between the external protrusion 223 and the internal protrusion 223 in the radial direction. In other words, 2(L1+L2)+L8 represents the thickness in the radial direction of yoke 221. Note that L1 and L2 are arbitrary lengths.

Note that, although it is assumed in the present example that the external protrusion 223 and the internal protrusion 223 have the same shape and the same size, and are symmetrically disposed about the yoke centerline CL0 in the radial direction, they may have a different shape and a different size, and may be asymmetrically disposed about the yoke centerline CL0 in the radial direction.

First, the cross-sectional shape of the external protrusion 223 will be described. Let us consider the isosceles triangle A1A2A3 with the first end portion A1 being its apex and L1+L2 being its one side. Using the contact angle $\theta$ described above, the length L4 of the base of the isosceles triangle (line segment A2A3) is given by:

$$L4=2(L1+L2)\sin\theta$$

The dimension parallel to the combined centerline CL1 of the base of the isosceles triangle A1A2A3 (line segment A2A3) i.e., the protrusion dimension L3 from the contact surfaces 224 and 226 of the external protrusion 223 in the normal direction of the contact surfaces 224 and 226 is given by:

$$L3=L4\cos\theta=2(L1+L2)\sin\theta\cos\theta$$

$$=(L1+L2)\sin 2\theta$$

The protrusion dimension L3 turns out to be the standard height of the external protrusion 223. Note that actually a rounded corner formed by the press die is disposed on the tip of the protrusion 223, and therefore the actual height of the protrusion 223 turns out to be a dimension with a radius R added to L3. The protrusion dimension L5 in this case is given by:

$$L5=L3+\alpha R=(L1+L2)\sin 2\theta+\alpha R$$

Here, the coefficient $\alpha$ is provided taking into account the unevenness of dimension due to lamination of steel plates of the core piece 220, and it is preferred that there is an addition of about a few %-30% of the radius R (e.g., $\alpha \geq 1.3$).

On the other hand, a slight gap (about 10 μm, for example) is disposed between the tip portion of the external protrusion 223 and the bottom of the recess 225 so as to ensure that the first inclined surfaces 223a and 223b contact the second inclined surfaces 225a and 225b, and the contact surface 224 contacts the contact surface 226. Therefore, a depth L6 from the contact surfaces 224 and 226 of the recess 225 is given by:

$$L6=L5+\Delta L$$

where $\Delta L$ is the gap.

Note that, a distance L7 of reference position P0 on the combined centerline CL1 from the contact surfaces 224 and 226 is given by:

$$L7=(L1/2)/\tan\theta$$

As illustrated in FIG. 17, drawing the circle CA centered on the first end portion A1 with the distance RA being the radius between the second end portion A3 and the first end portion A1 of the first inclined surface 223b results in the circle CA to pass outside the first inclined surface 223b (line segment A2A3), whereby the first inclined surface 223b abuts the second inclined surface 225b of the recess 225. Therefore, a configuration which suppresses opening of the contact surface 224 and the contact surface 226 due to the bending stress with the first end portion A1 being the fulcrum is realized, when the protrusion 223 is combined with the recess 225.

Next, the cross-sectional shape of the internal protrusion 223 will be described. As has been described above, the internal protrusion 223 and the external protrusion 223 have the same shape and the same size. As a result, the dimensional relation of the internal protrusion 223 turns out to be similar to the external protrusion 223, considering the isosceles triangle B1B2B3 with the first end portion B1 being its apex and L1+L2 being its one side. In other words, drawing the circle CB centered on the first end portion B1 with the distance RB being the radius between the second end portion B3 and the first end portion B1 of the first inclined surface 223a, as illustrated in FIG. 17, results in the circle CB to pass outside the first inclined surface 223a, whereby the first inclined surface 223a abuts the second inclined surface 225a of the recess 225. Therefore, a configuration is realized which suppresses opening of the contact surface 24 and the contact surface 26 due to the bending stress with the first end portion B1 being the fulcrum.

(5-3. Setting Condition of Contact Angle $\theta$)

Next, referring to FIG. 6 described above, an example of the setting condition of the contact angle $\theta$ will be described. As has been described above, it is preferred that the contact angle $\theta$ is set so that the isosceles triangle A1A2A3 and an isosceles triangle B1B2B3 are formed, to prevent the combination of the external protrusion 223 and the external recess 225, and the combination of the internal protrusion 223 and the internal recess 225, from coming apart due to the bending stress.

In the example illustrated in FIG. 6, lines are drawn from the third end portions B2 and A2, respectively, with the contact angle $\theta$ being 45°, 40°, 30°, 27°, 20°, 17°, 15°, 10° and 7°, in the order starting from the right side of the figure. Provided that both the circle CA of the radius RA with the first end portion A1 being the fulcrum and the circle CB of the radius RB with the first end portion B1 being the fulcrum intersect with the lines of these contact angles, RA=RB=L1+L2 holds and it is possible to form the isosceles triangle A1A2A3 and the isosceles triangle B1B2B3, with L1+L2 being one side thereof.

In FIG. 6, the circle CB of the radius RB with the first end portion B1 being the fulcrum is illustrated. As illustrated in FIG. 6, the contact angle $\theta$ intersecting with the circle CB takes the values of 7°, 10°, 15°, 17° and 20°, and it is possible to form the isosceles triangle B1B2B3 in the case that the contact angle θ of the first inclined surface 223a is set within the angle range of 7°-20°. FIG. 6 illustrates the case that intersection with the circle CB is set on the second end portion B3 in the case that contact angle θ is set to 15°, for example. Similarly, setting the contact angle θ of the first inclined surface 223b within the angle range of 7°-20° allows for forming the isosceles triangle A1A2A3.

Note that, also in the present embodiment, setting the contact angle θ within a range of 9.5°-17.2° corresponding to the friction coefficient of the laminated silicon steel plate, similarly to the first embodiment, allows for preventing the engaging portion of the protrusion 223 and the recess 225 from moving due to magnetic vibration, impact or the like, for example, after shrink fitting the frame 4 to the circularly coupled core pieces 220.

(5-4. Effect of Fourth Embodiment)

According to the fourth embodiment described above, the following effect is exhibited. Specifically, the smaller rotating electrical machine becomes and the thinner yoke 221 of the stator core 5 becomes, the more the contact area between the adjacent core pieces 220 may decrease, which may lead to decrease of magnetic path. According to the present embodiment, it is possible to dispose two protrusions 223 and two recesses 225 respectively to each of the core pieces 220 so as to increase the contact area, whereby it is possible to expand the magnetic path of the stator core 5. In addition, it is possible to realize a structure that suppresses generation of a gap between the contact surfaces 224 and 226 of the adjacent core pieces 220, even in the case that bending force acts thereon with the first end portions A1 and B1 being the fulcrum. Although the configuration of the present embodiment is effective for a small (small capacity) rotating electrical machine as has been described above, it is preferred that the yoke 221 of the stator core 5 has the thickness to a certain degree for the structure in which two protrusions 223 and two recesses 225 are disposed in the radial direction, which is particularly suitable for a medium to large (medium-capacity to large-capacity) rotating electrical machine.

Note that, although the number of the protrusions 223 and the recesses 225 disposed in each of the core pieces 220 is two, respectively, in the foregoing description, there may be three or more of them. In such a case, it is possible to further enhance the effect of expanding the magnetic path.

6. Exemplary Modification

Note that the disclosed embodiments are not limited to those described above, and a variety of variations are possible within a range that does not deviate from the spirit and technical concept thereof. In the following, such an exemplary modification will be described.

(6-1. Case of Disposing a Gap Between Contact Surfaces)

Although a case that the contact surface 224 and the contact surface 226 of the adjacent core piece 220 contact each other has been described above as an example, there may be a configuration in which a slight gap is disposed between the contact surface 224 and the contact surface 226 to mitigate the compressive force acting on the contact surfaces. Referring to FIG. 18, an example of the shape of the protrusion and the recess of the core piece in the exemplary modification will be described.

As illustrated in FIG. 18, in the exemplary modification, a slight gap (around dozens μms, for example) is disposed between the contact surface 224 and the contact surface 226 of the adjacent core piece 220. On the other hand, the tip portions of the two protrusions 223 are in contact with the bottoms of the two recesses 225, respectively. The depth L6 of the recess 225 from the contact surface 226 is given by:

$$L6=L5-\Delta L$$

where ΔL is the gap.

It is preferred that the gap ΔL is set to an appropriate value in accordance with the size of interference when shrink fitting the frame 4 to the circularly coupled core pieces 220, the circularity of the inner diameter of the frame 4, the tip shape of the tooth 222, or the like.

Note that, since the relation between respective dimensions L1-L8 (except L6) in the exemplary modification is similar to that in the fourth embodiment described above, explanation thereof is omitted.

According to the exemplary modification, it is possible to realize a structure that suppresses variation of the gap ΔL between the contact surfaces 224 and 226 of the adjacent core piece 220, even in the case that a bending force acts thereon with the first end portions A1 and B1 being the fulcrum, in a state where the protrusion 223 and the recess 225 are coupled each other. In addition, the gap ΔL is preliminarily disposed and therefore it is possible to mitigate the compressive force acting on the contact surfaces 224 and 226.

(6-2. Others)

Although a case has been described above as an example in which each of the core piece 220 has one tooth 222, there may be a configuration in which each of the core pieces 220 has two or more teeth 222 such that, for example, the winding is realized as distributed winding. Applying a connection shape described above also for such core pieces allows for exhibiting an effect similar to that in each of the embodiments or the like.

It is noted that if terms "vertical," "parallel," "plane," etc. are used in the above description, these terms are not used in the exact meanings thereof. Specifically, these terms "vertical," "parallel," and "plane" allow tolerances and errors in design and producing and have meanings of "approximately vertical," "approximately parallel," and "approximately plane."

It is noted that if terms "same," "equal," "different," etc. in relation to a dimension, a size, a shape and a position of the appearance are used in the above description, these terms are not used in the exact meaning thereof. Specifically, these terms "same," "equal," and "different" allow tolerances and errors in design and producing and have meanings of "approximately the same," "approximately equal," and "approximately different."

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

What is claimed is:

1. A rotating electrical machine comprising:
   a plurality of core pieces forming a stator core, each of the core pieces comprising:
      contact surfaces along a radial direction relative to a rotation axis on one side end and another side end of the core piece in a peripheral direction around the rotation axis;
      a tapered protrusion on the contact surface of the one side end of the core piece, the protrusion comprising first inclined surfaces outside and inside in the radial direction; and a recess on the contact surface of the other side end of the core piece, the recess comprising second inclined surfaces contacting the first inclined surfaces outside and inside in the radial direction to receive the protrusion of adjacent core piece, a cross-sectional shape perpendicular to the rotation axis of the protrusion being a shape such that, inside a circle centered on a first end portion of one side in the radial direction of the contact surface with a distance being a radius between a second end portion on a tip side of the first inclined surface located on an opposite side of the first end portion on the protrusion and the first end portion, at least a part of the first inclined surfaces located on the opposite side of the first end portion contact the second inclined surfaces, wherein the cross-sectional shape of the protrusion is a shape such that a third end portion on a base end side of the first inclined surface located on an opposite side of the first end portion on the protrusion is located on circumference of the circle.

2. The rotating electrical machine according to claim 1, wherein the protrusion and the recess are disposed outward in the radial direction on the contact surface, and wherein the cross-sectional shape of the protrusion is a shape such that the third end portion on the base end side of the first inclined surface located outside in the radial direction on the protrusion is located on the circumference of the circle centered on the first end portion inside in the radial direction of the contact surface with the distance being the radius between the second end portion on the tip side of the first inclined surface located outside in the radial direction on the protrusion and the first end portion.

3. The rotating electrical machine according to claim 2, wherein the protrusion and the recess are disposed outward in the radial direction on the contact surface, and wherein the cross-sectional shape of the protrusion is a shape such that an inclination angle between a normal direction of the contact surface and the first inclined surface located outside in the radial direction on the protrusion is smaller than an inclination angle between the normal direction and the first inclined surface located inside in the radial direction of the protrusion.

4. The rotating electrical machine according to claim 3, wherein the core piece is formed by laminating a plurality of steel plates, and wherein the cross-sectional shape of the protrusion is a shape such that an inclination angle between the first inclined surface and the normal direction of the contact surface is set on basis of a friction coefficient of the steel plate.

5. The rotating electrical machine according to claim 4, wherein two or more of the protrusions are disposed on the contact surface of the one side end, and wherein two or more recesses are disposed on the contact surface of the other side end and respectively receive the two or more protrusions of adjacent core piece.

6. The rotating electrical machine according to claim 3, wherein two or more of the protrusions are disposed on the contact surface of the one side end, and wherein two or more recesses are disposed on the contact surface of the other side end and respectively receive the two or more protrusions of adjacent core piece.

7. The rotating electrical machine according to claim 2, wherein the core piece is formed by laminating a plurality of steel plates, and wherein the cross-sectional shape of the protrusion is a shape such that an inclination angle between the first inclined surface and the normal direction of the contact surface is set on basis of a friction coefficient of the steel plate.

8. The rotating electrical machine according to claim 2, wherein two or more of the protrusions are disposed on the contact surface of the one side end, and wherein two or more recesses are disposed on the contact surface of the other side end and respectively receive the two or more protrusions of adjacent core piece.

9. The rotating electrical machine according to claim 1, wherein the protrusion and the recess are disposed outward in the radial direction on the contact surface, and wherein the cross-sectional shape of the protrusion is a shape such that an inclination angle between a normal direction of the contact surface and the first inclined surface located outside in the radial direction on the protrusion is smaller than an inclination angle between the normal direction and the first inclined surface located inside in the radial direction of the protrusion.

10. The rotating electrical machine according to claim 1, wherein the core piece is formed by laminating a plurality of steel plates, and wherein the cross-sectional shape of the protrusion is a shape such that an inclination angle between the first inclined surface and the normal direction of the contact surface is set on basis of a friction coefficient of the steel plate.

11. The rotating electrical machine according to claim 1, wherein two or more of the protrusions are disposed on the contact surface of the one side end, and wherein two or more recesses are disposed on the contact surface of the other side end and respectively receive the two or more protrusions of adjacent core piece.

* * * * *